United States Patent
Tran-Thi et al.

(10) Patent No.: US 11,318,442 B2
(45) Date of Patent: May 3, 2022

(54) METHOD FOR PRODUCING CORE-SHELL HYBRID MATERIALS

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE—CNRS -, Paris (FR)

(72) Inventors: Thu-Hoa Tran-Thi, Montrouge (FR); Christophe Theron, Villeneuve-lès-Maguelone (FR); William Bamogo, Le Pecq (FR); Trung-Hieu Nguyen, Fontenay-aux-Roses (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE—CNRS—, Paris (FR)

( * ) Notice: Subject to any disclaimer, the term of this patent is extended or adjusted under 35 U.S.C. 154(b) by 369 days.

(21) Appl. No.: 16/476,166

(22) PCT Filed: Jan. 8, 2018

(86) PCT No.: PCT/FR2018/050030
§ 371 (c)(1),
(2) Date: Jul. 5, 2019

(87) PCT Pub. No.: WO2018/127671
PCT Pub. Date: Jul. 12, 2018

(65) Prior Publication Data
US 2019/0351392 A1    Nov. 21, 2019

(30) Foreign Application Priority Data

Jan. 6, 2017   (FR) ..................................... 17 50145

(51) Int. Cl.
*B01J 20/28*   (2006.01)
*B01D 53/02*   (2006.01)
*B01J 20/10*   (2006.01)
*B01J 20/20*   (2006.01)
*B01J 20/32*   (2006.01)
*C02F 1/28*    (2006.01)

(52) U.S. Cl.
CPC ........ *B01J 20/28021* (2013.01); *B01D 53/02* (2013.01); *B01J 20/103* (2013.01); *B01J 20/20* (2013.01); *B01J 20/28007* (2013.01); *B01J 20/28019* (2013.01); *B01J 20/28023* (2013.01); *B01J 20/28047* (2013.01); *B01J 20/3204* (2013.01); *B01J 20/3225* (2013.01); *B01J 20/3236* (2013.01); *B01J 20/3293* (2013.01); *C02F 1/288* (2013.01); *B01D 2253/102* (2013.01); *B01D 2253/106* (2013.01); *B01D 2253/25* (2013.01); *C02F 1/281* (2013.01); *C02F 1/283* (2013.01)

(58) Field of Classification Search
CPC .... B01J 20/18; B01J 20/28021; B01J 20/103; B01J 20/20; B01J 20/28007; B01J 20/28019; B01J 20/28023; B01J 20/28047; B01J 20/3204; B01J 20/3225; B01J 20/3236; B01J 20/3293; B01D 53/02; B01D 2253/102; B01D 2253/106; B01D 2253/25; C02F 1/288; C02F 1/281; C02F 1/283
USPC .......................................................... 502/405
See application file for complete search history.

(56) References Cited

FOREIGN PATENT DOCUMENTS

DE          43 43 358 A1    6/1995
KR          2007-0004228 A  1/2007

OTHER PUBLICATIONS

Liu et al., "Carbon-silica xerogel and aerogel composites", Journal of Porous Materials, 1995, p. 75-84, vol. 1; 10 pages.
International Search Report dated Apr. 10, 2018 in corresponding International application No. PCT/FR2018/050030; 7 pages.
Xingmei Guo, et al., "Theoretical and experimental studies on silica-coated carbon spheres composites", in Applied Surface Science, 2013, vol. 283, pp. 215-221 (7 pgs.).

*Primary Examiner* — Edward M Johnson
(74) *Attorney, Agent, or Firm* — Maier & Maier, PLLC

(57) ABSTRACT

A method for producing a core-shell hybrid material made of an activated carbon core surrounded by a mesoporous silica sol-gel shell, the method including the formation of a mesoporous silica sol-gel shell around activated carbon particles. Also, the core-shell hybrid material formed by the method, and its use as a filtering material in filtering systems.

13 Claims, 24 Drawing Sheets

(A)  (B)

METHOD FOR PRODUCING CORE-SHELL HYBRID MATERIALS

FIELD

The invention relates to the preparation of core-shell hybrid materials consisting of an activated carbon core surrounded by a layer of a silica-based nanoporous sol-gel material, and also to the core-shell hybrid materials as such. These materials are of use in the field of filtration, in particular for filtration of water and of air.

BACKGROUND

Available soft water represents only 0.26% of the Earth's water and its amount remains practically invariable. The population, for its part, is constantly increasing and the demand for water is growing fast. According to the World Health Organization (WHO) report, 748 million individuals still do not have access to potable water in 2014 and 1.8 billion individuals are thought to use unsafe water contaminated with feces [1]. Moreover, according to a projection of the Bureau de Recherches Géologiques et Minières [French geological survey] [2], in 2025, 63% of the world's population will probably be suffering a water shortage. It will become necessary to desalinate seawater and to retreat wastewater to make potable water. These treatments already exist, but are too expensive for developing countries.

In developed countries, the conventional treatment of surface water for providing potable water involves several steps, including coagulation, sedimentation, filtration and disinfection. Coagulation through the addition of coagulants makes it possible to aggregate the particles dissolved or suspended in the water which will precipitate and separate out in the separating tank. Filtration involves several steps including a first filtration with sand which makes it possible to remove the final particles in suspension. This is followed by treatments with ozone and active carbon to destroy and trap the total organic compounds (TOCs). In this step, the compounds less than 100 nm in size may still be present in the water. To remove viruses and organic compounds, membrane filtration, such as ultrafiltration or nanofiltration, is used. Ultrafiltration like nanofiltration allows micropollutants to pass through, such as pesticides, drug residues and other organic compounds, of which there are approximately 5000 different products.

Certain micropollutants are capable of reacting with the chlorine used to disinfect water, to form disinfection by-products known as "emerging pollutants" which are toxic and/or carcinogenic, such as chloramines, nitrosamines and trihaloalkanes.

Even though the standards required in developed countries for potable water are drastic in terms of concentration of total organic compounds ([TOCs]<2 ppm) [3], a daily consumption of water contaminated with traces or ultra-traces of drug residues including antibiotics, of pesticides or of sex hormones could in the long term induce effects harmful to the health.

It is therefore necessary to further reduce the content of total organic compounds in potable water. Inverse osmosis is the most efficient method for removing small organic molecules, but its cost in terms of energy is also the highest owing to the high pressures to be applied for passing the water through a semi-permeable membrane comprising very small pores. The last few years have seen the emergence of studies on direct osmosis with the use of composite membranes for the elimination of organic compounds, but osmosis is especially used for seawater desalination.

At the current time, active carbon is widely used for the depollution of water. However, on its own, it remains ineffective in the case of small polar molecules (formaldehyde, acetaldehyde, methyl and ethyl ketones), and new organic pollutants such as pesticides (glyphosate), drug residues (of human or animal origin) or else micropollutants (chloroform, methylene chloride, acetonitrile, dimethylformamide, isopropyl alcohol, etc.) originating from the industrial field [4].

Various nanostructured materials have been proposed in the literature for replacing active carbon. These nanostructured materials may be zeolites [5], mesoporous molecular sieves [6], silica nanoparticles [7], or else microporous titanosilicates [8]. For a few years, active carbon has also been combined with sol-gel materials. It is used in the majority of cases in order to increase the $TiO_2$ photocatalysis yield. The following are thus found:

Grains of active carbon have been coated with $TiO_2$ via the sol-gel process. The intended applications are the decontamination of water, in particular wastewater containing dyes [9], [10], the degradation of Rhodamine B [11], and also the decomposition of $NH_3$ or formaldehyde [12], [13].

$TiO_2$ powder, synthesized by the sol-gel process, deposited on active carbon by impregnation [14]. The objective is to decontaminate liquids containing in particular dibenzothiophene.

$TiO_2$ obtained by the sol-gel method linked to carbon nanotubes by grafting or coating [15]. The aim is here again to improve the $TiO_2$ photocatalysis yield, with applications in the environmental sector.

Studies combining active carbon with a silicon-based sol-gel are more rare. The active carbon may simply play the role therein of a support before being eliminated by carbonization, and is not present in the final product obtained [16]. A core-shell hybrid material with an active carbon core surrounded by non-functionalized silica, prepared by a sol-gel process in ethanol, has also been described by Guo et al. [16]. These materials are intended for use as photonic crystals. In the light of the FESEM images disclosed in the article, it appears that the materials are aggregated in the form of very large monoliths.

The depollution of air and in particular of the volatile organic compounds via air purifiers or extractor hoods is based essentially on the use of active carbon-based filters. The latter in fact has a high adsorption capacity and is inexpensive. However, active carbon traps very poorly the small polar molecules present in interior air, such as formaldehyde, acetaldehyde, methyl and ethyl ketones, acetic acid or else acrylamide from the decomposition of superheated oil (fried foods and the like). In order to overcome this inefficiency of trapping of small and polar VOCs by active carbon, the latter is often impregnated with reagents capable of reacting with the target pollutants. However, a drawback of the impregnated materials is the release into the air of impregnation reagents or products resulting from the reaction thereof.

In the light of the aforementioned, there is still a need for new filtering materials, in particular for the filtration of water and gas, such as air, combining a high capacity of the material to filter various types of polar and nonpolar molecules with a simple and efficient preparation process.

SUMMARY

One objective of the invention is thus to provide a simple and efficient method for producing a filtering material which makes it possible to achieve these performance qualities.

To the inventors' credit, they have discovered, very unexpectedly and after numerous research studies, that it is possible to achieve this objective with a particular method for preparing a filtering material combining active carbon and a mesoporous sol-gel material in the form of nanoparticles, thus forming a material with an active carbon core and a sol-gel nanoparticle shell.

A sol-gel material is a material obtained by means of a sol-gel process consisting in using, as precursors, metal alkoxides of formula $M(OR)_x R'_{n-x}$ where M is a metal, in particular silicon, R is an alkyl group and R' a group bearing one or more functions with n=4 and x being able to range between 2 and 4. In the presence of water, the alkoxy groups (OR) are hydrolyzed to silanol groups (Si—OH). The latter condense while forming siloxane bonds (Si—O—Si—). When siliceous precursors in low concentration in an organic solvent are added dropwise to a basic aqueous solution, particles of generally less than 1 µm in size are formed, and remain in suspension without precipitating. Depending on the synthesis conditions, it is possible to obtain monodisperse or polydisperse nanoparticles, of spherical shape, and the diameters of which can range from a few nanometers to 2 µm. The porosity of the silica nanoparticles (microporosity or mesoporosity) can be varied by adding a surfactant.

A first subject of the invention thus relates to a method for preparing a core-shell hybrid material consisting of an active carbon core surrounded by a shell of a silica-based mesoporous sol-gel material, said method comprising the formation of a mesoporous sol-gel silica shell surrounding active carbon particles and the recovery of the core-shell hybrid material thus obtained.

The term "mesopore(s)" is used herein in the sense commonly accepted by those skilled in the art which corresponds to the definition given by the IUPAC (International Union of Pure and Applied Chemistry). Thus, the term "mesopores" is intended to mean pores of a size between 20 and 500 nm, whereas micropores have a size of less than 20 nm and macropores a size of greater than 500 nm. A mesoporous material is thus a material of which the pores consist mainly of mesopores. Preferably, the degree of mesopores of the sol-gel shell of the core-shell hybrid material according to the invention is greater than or equal to 70%, preferably greater than or equal to 75%, more preferably greater than or equal to 90%. Entirely preferentially, the degree of mesopores of the sol-gel shell of the core-shell hybrid material according to the invention is equal to 100%. The degree of mesopores is expressed as a percentage relative to the total number of pores of the sol-gel shell.

The mesoporous sol-gel silica shell is formed from at least one organosilicon precursor. It is thus possible to use a single organosilicon precursor or a mixture of organosilicon precursors. The at least one organosilicon precursor is advantageously chosen from tetramethoxysilane (TMOS), tetraethoxysilane (TEOS), phenyltrimethoxysilane (PhTMOS), phenyltriethoxysilane (PhTEOS), (2-phenylethyl)triethoxysilane, 3-aminopropyltriethoxysilane (APTES), (3-glycidyloxypropyl)trimethoxysilane (GPTMOS), (3-glycidyloxypropyl)triethoxysilane (GPTES), N-(2-aminoethyl)-3-(trimethoxysilyl)propylamine (NH$_2$-TMOS), N-(trimethoxysilylpropyl)ethylenediamine triacetate, acetoxyethyltrimethoxysilane (AETMS), ureidopropyltriethoxysilane (UPTS), 3-(4-semicarbazidyl)propyltriethoxysilane (SCPTS) and mixtures thereof, preferably from tetramethoxysilane (TMOS), tetraethoxysilane (TEOS), phenyltrimethoxysilane (PhTMOS), phenyltriethoxysilane (PhTEOS), (3-glycidyloxypropyl)triethoxysilane (GPTES), N-(2-aminoethyl)-3-(trimethoxysilyl)propylamine (NH$_2$-TMOS), 3-aminopropyltriethoxysilane (APTES), N-(trimethoxysilylpropyl)ethylenediamine triacetate, acetoxyethyltrimethoxysilane (AETMS), 3-(4-semicarbazidyl)propyltriethoxysilane (SCPTS) and mixtures thereof.

In one embodiment, the organosilicon precursor is tetraethoxysilane or tetramethoxysilane, preferably tetraethoxysilane. In another embodiment, the organosilicon precursor is a mixture of tetraethoxysilane or of tetramethoxysilane and a functionalized organosilicon precursor. Advantageously, this involves amine, amide, urea, acid or aryl functions. The functionalized organosilicon precursor may in particular be chosen from phenyltrimethoxysilane (PhTMOS), phenyltriethoxysilane (PhTEOS), (2-phenylethyl)triethoxysilane, 3-aminopropyltriethoxysilane (APTES), (3-glycidyloxypropyl)trimethoxysilane (GPTMOS), (3-glycidyloxypropyl)triethoxysilane (GPTES), N-(2-aminoethyl)-3-(trimethoxysilyl)propylamine (NH$_2$-TMOS), N-(trimethoxysilylpropyl)ethylenediamine triacetate, acetoxyethyltrimethoxysilane (AETMS), ureidopropyltriethoxysilane (UPTS), 3-(4-semicarbazidyl)propyltriethoxysilane (SCPTS) and mixtures thereof, preferably from phenyltrimethoxysilane (PhTMOS), phenyltriethoxysilane (PhTEOS), (3-glycidyloxypropyl)triethoxysilane (GPTES), N-(2-aminoethyl)-3-(trimethoxysilyl)propylamine (NH$_2$-TMOS), 3-aminopropyltriethoxysilane (APTES), N-(trimethoxysilylpropyl)ethylenediamine triacetate, acetoxyethyltrimethoxysilane (AETMS), 3-(4-semicarbazidyl)propyltriethoxysilane (SCPTS) and mixtures thereof.

Mixtures of organosilicon precursors that are preferred comprise the mixtures of tetraethoxysilane (TEOS) with N-(2-aminoethyl)-3-(trimethoxysilyl)propylamine (NH$_2$-TMOS), with N-(trimethoxysilylpropyl)ethylenediamine triacetate, with phenyltrimethoxysilane (PhTMOS) and with 3-(4-semicarbazidyl)propyltriethoxysilane (SCPTS) and also mixtures of tetramethoxysilane (TMOS) with 3-aminopropyltriethoxysilane (APTES), with phenyltrimethoxysilane (PhTMOS), with phenyltriethoxysilane (PhTEOS), with acetoxyethyltrimethoxysilane (AETMS), with (3-glycidyloxypropyl)triethoxysilane (GPTES) and with 3-(4-semicarbazidyl)propyltriethoxysilane (SCPTS).

During the use of a mixture of tetramethoxysilane and of one or more other organosilicon precursors, the molar proportions of tetramethoxysilane (TMOS)/other organosilicon precursor(s) can be varied between 100/0 and 50/50, preferably between 100/0 and 75/25, more preferably between 97/3 and 75/25 or between 98/2 and 89/11.

The active carbon used for the present invention may be of plant or animal origin. Those skilled in the art will select it as a function of the desired properties, in particular filtration properties. Thus, it is possible to use various forms of active carbon, for instance balls, powder, granules, fibers or rods. Preferably, an active carbon with a large specific surface area of adsorption, in particular from 800 to 1500 m$^2$/g, will be used. The active carbon may be mixed at various concentrations with the coating composition (sol-gel composition) for moderating the amount of core/shell.

In a first embodiment, the method of the invention is characterized in that the formation of a mesoporous sol-gel silica shell around the active carbon particles comprises:

a) the formation of a sol-gel nanoparticle shell around active carbon particles in a basic aqueous solution starting from at least one organosilicon precursor, the aqueous solution containing aqueous ammonia (NH$_4$OH) and a surfactant, b) the recovery of the active carbon surrounded by the sol-gel material shell prepared in step a), c) the elimination of any surfactant residues from the active carbon surrounded by the sol-gel material shell so as to free the pores of the sol-gel material formed in step a), and characterized in that, in step a), a basic aqueous solution containing the aqueous ammonia, the surfactant and the active carbon is first provided, then the at least one organosilicon precursor is added, this precursor being solubilized in an organic solvent.

Thus, according to this embodiment, the method for preparing a core-shell hybrid material consisting of an active carbon core surrounded by a mesoporous sol-gel silica shell comprises the following steps:

a) the formation of a sol-gel nanoparticle shell around active carbon particles in a basic aqueous solution starting from at least one organosilicon precursor, the aqueous solution containing aqueous ammonia ($NH_4OH$) and a surfactant, b) the recovery of the active carbon surrounded by the sol-gel silica shell prepared in step a), c) the elimination of any surfactant residues from the active carbon surrounded by the sol-gel material shell so as to free the pores of the sol-gel material formed in step a), d) the recovery of the core-shell hybrid material consisting of an active carbon core surrounded by a mesoporous sol-gel silica shell obtained in step c), characterized in that, in step a), a basic aqueous solution containing the aqueous ammonia, the surfactant and the active carbon is first provided, then the at least one organosilicon precursor is added, this precursor being solubilized in an organic solvent.

Surprisingly, this embodiment gives rise to discrete core-shell particles, the silica nanoparticles having a low agglomeration between one another. In the light of the literature (see for example [19]), those skilled in the art thought up until now that it was necessary to perform the synthesis of the sol-gel nanoparticles in an organic solvent such as ethanol so as, on the one hand, to form small nanodisperse particles and, on the other hand, to avoid the agglomeration of the nanoparticles between one another. In the experiments of Rao et al. [18] for example, the amounts of ethanol and water range between 1 and 8 mol/l, and 3 and 14 mol/l, respectively, and depending on the concentration of the precursor in solution in the ethanol, the authors obtain silica nanoparticle diameters ranging between 30 and 460 nm.

By contrast, in this embodiment, the synthesis is carried out in an aqueous solution and the provision of the organic solvent for the solubilization of the organosilicon precursors is very small compared with the volume of the final sol. Advantageously, the amount of organic solvent is from 1 to 5% by volume, preferably from 1.5 to 4% by volume and even more preferentially from 1.8 to 3% by volume relative to the final sol (that is to say the whole of the aqueous solution containing the aqueous ammonia, the surfactant and the active carbon, plus the organosilicon precursor solubilized in the organic solvent). Advantageously, the basic aqueous solution provided in step a) if free of organic solvent and the organic solvent is only provided with the organosilicon precursors. Without wishing to be bound by any theory, the inventors think that it is the sequence of addition of the various reagents which makes it possible to prevent the agglomeration of the nanoparticles despite the use of an aqueous solvent. It in fact appears to be essential to add the organosilicon precursor last.

The organic solvent used to solubilize the organosilicon precursor(s) will be chosen by those skilled in the art as a function of the organosilicon precursor or of the mixture of organosilicon precursors used, in particular from protic or aprotic polar organic solvents. This organic solvent can for example be chosen from $C_1$-$C_4$ linear aliphatic alcohols, in particular methanol, ethanol and propan-1-ol. Preferably, the organic solvent is ethanol.

The organosilicon precursors and the active carbon that can be used in this embodiment are those described in detail above. Preferably, the at least one organosilicon precursor is chosen from tetraethoxysilane (TEOS), phenyltrimethoxysilane (PhTMOS), phenyltriethoxysilane (PhTEOS), (2-phenylethyl)triethoxysilane, 3-aminopropyltriethoxysilane (APTES), (3-glycidyloxypropyl)trimethoxysilane (GPTMOS), (3-glycidyloxypropyl)triethoxysilane (GPTES), N-(2-aminoethyl)-3-(trimethoxysilyl)propylamine ($NH_2$-TMOS), N-(trimethoxysilylpropyl)ethylenediamine triacetate, acetoxyethyltrimethoxysilane (AETMS), ureidopropyltriethoxysilane (UPTS), 3-(4-semicarbazidyl)propyltriethoxysilane (SCPTS) and mixtures thereof, preferably from tetraethoxysilane (TEOS), N-(2-aminoethyl)-3-(trimethoxysilyl)propylamine ($NH_2$-TMOS), N-(trimethoxysilylpropyl)ethylenediamine triacetate, phenyltriemthoxysilane (PhTMOS), 3-(4-semicarbazidyl)propyltriethoxysilane (SCPTS) and mixtures thereof. When a mixture of tetraethoxysilane and of a functionalized organosilicon precursor is used, the following mixtures are preferred: tetraethoxysilane with N-(2-aminoethyl)-3-(trimethoxysilyl)propylamine ($NH_2$-TMOS), with N-(trimethoxysilylpropyl)ethylenediamine triacetate, with phenyltrimethoxysilane (PhTMOS) and with 3-(4-semicarbazidyl)propyltriethoxysilane (SCPTS). The active carbon is preferably in powder form, in particular of micrometric size.

During the use of a mixture of tetramethoxysilane or of tetraethoxysilane, preferably tetraethoxysilane, and of one or more functionalized organosilicon precursors, the molar proportions of tetramethoxysilane (TMOS) or tetraethoxysilane (TEOS)/other organosilicon precursor(s) can be varied between 100/0 and 50/50, preferably between 100/0 and 75/25, more preferably between 97/3 and 75/25 or between 98/2 and 89/11.

The basic aqueous solution used in step a) is preferably an aqueous ammonia solution at a concentration of from 0.8 to 3.2 mol·$l^{-1}$, preferably from 2.0 to 2.3 mol·$l^{-1}$.

The basic aqueous solution used in step a) can contain a small amount of organic solvent, in particular protic or aprotic polar organic solvent. This organic solvent can for example be chosen from $C_1$ to $C_4$ linear aliphatic alcohols, in particular methanol, ethanol and propanol. Preferably, the organic solvent is ethanol. Preferably, the organic solvent content does not exceed 5% by volume. More preferentially, the basic aqueous solution is free of organic solvent.

The role of the surfactant used during step a) of the first embodiment is, on the one hand, to promote the interaction between the surface of the active carbon and the siliceous precursors and, on the other hand, to structure the silica network to make it mesoporous. The surfactant used in step a) is preferably an ionic surfactant, more preferentially a quaternary ammonium compound. This quaternary ammonium compound is advantageously a cetyltrimethylammonium halide, preferably cetyltrimethylammonium bromide or cetyltrimethylammonium chloride, more preferentially cetryltrimethylammonium bromide.

The recovery of the core-shell material of active carbon surrounded by the sol-gel material shell in step b) of the first embodiment can for example be carried out by separation, by any known means and in particular by centrifugation or filtration, of the mixture obtained during step a). Preferably, the core-shell material is recovered by centrifugation in the first method.

The elimination of any surfactant residues present in the core-shell material in step c) can be carried out by any known means and in particular by washing, for example using hydrochloric acid and ethanol, preferably by a succession of washes using hydrochloric acid and ethanol.

The recovery of the core-shell material of active carbon surrounded by the sol-gel material shell in step b) can for example be carried out by separation, by any known means and in particular by centrifugation or filtration, of the mixture obtained during step a). Preferably, the core-shell material is recovered by centrifugation. The elimination of the surfactant makes it possible to free the pores of the material obtained in step b). After this elimination step, the core-shell hybrid material consisting of an active carbon core surrounded by a silica-based mesoporous sol-gel nanoparticle shell is thus obtained.

This core-shell hybrid material is recovered in step d). This recovery can for example be carried out by separation, by any known means and in particular by centrifugation or filtration, of the mixture obtained during step a). Preferably, the core-shell hybrid material is recovered by centrifugation.

In a second embodiment, the method of the invention is characterized in that step a) of formation of the mesoporous sol-gel silica shell comprises the preparation of a sol of a mixture of at least one organosilicon precursor with an aqueous solution containing an organic solvent, followed by the coating of the active carbon with this sol. A thin film of mesoporous sol-gel silica, which is preferably functionalized, thus forms around the active carbon particles. Preferably, the sol is free of surfactant.

The organic solvent is preferably a protic or aprotic polar organic solvent. It can for example be chosen from $C_1$ to $C_4$ linear aliphatic alcohols, in particular methanol, ethanol and propan-1-ol. Preferably, the organic solvent is methanol. The volume proportion of the organic solvent relative to the volume of the sol can range between 30 and 50%. The volume proportion of the water relative to the volume of the sol can range between 15 and 30%.

The organosilicon precursors and the active carbon that can be used in this embodiment are those described in detail above in connection with the method according to the invention in general. Preferably, the at least one organosilicon precursor is chosen from tetramethoxysilane (TMOS), phenyltrimethoxysilane (PhTMOS), phenyltriethoxysilane (PhTEOS), (2-phenylethyl)triethoxysilane, 3-aminopropyltriethoxysilane (APTES), (3-glycidyloxypropyl)trimethoxysilane (GPTMOS), (3-glycidyloxypropyl)triethoxysilane (GPTES), N-(2-aminoethyl)-3-(trimethoxysilyl)propylamine ($NH_2$-TMOS), N-(trimethoxysilylpropyl)ethylenediamine triacetate, acetoxyethyltrimethoxysilane (AETMS), ureidopropyltriethoxysilane (UPTS), 3-(4-semicarbazidyl)propyltriethoxysilane (SCPTS) and mixtures thereof, more preferentially from tetramethoxysilane (TMOS), 3-aminopropyltriethoxysilane (APTES), phenyltriemethoxysilane (PhTMOS), phenyltriethoxysilane (PhTEOS), acetoxyethyltrimethoxysilane (AETMS), (3-glycidyloxypropyl)triethoxysilane (GPTES) and 3-(4-semicarbazidyl)propyltriethoxysilane (SCPTS). When a mixture of tetramethoxysilane and of a functionalized organosilicon precursor is used, the following mixtures are preferred: tetramethoxysilane (TMOS) with 3-aminopropyltriethoxysilane (APTES), with phenyltriemethoxysilane (PhTMOS), with phenyltriethoxysilane (PhTEOS), with acetoxyethyltrimethoxysilane (AETMS), with (3-glycidyloxypropyl)triethoxysilane (GPTES) and with 3-(4-semicarbazidyl)propyltriethoxysilane (SCPTS).

During the use of a mixture of tetramethoxysilane and of one or more functionalized organosilicon precursors, the molar proportions of tetramethoxysilane (TMOS)/other organosilicon precursor(s) can be varied between 100/0 and 50/50, preferably between 100/0 and 75/25 and more preferably between 97/3 and 75/25.

According to a first variant of this second embodiment, the active carbon is in the form of particles, in particular of granules or of rods, of millimetric size, and the coating is carried out by dipping said particles in the sol, then removing from the sol or by pouring the sol over the particles through a sieve. The core-shell particles thus obtained are advantageously dried, for example in an oven, so as to remove residual solvents. Preferably, active carbon rods, in particular of millimetric size, will be used. The method of pouring so as to form a thin film of functionalized sol-gel material around the active carbon core will be favored. This rapid method can be easily transposed to the industrial scale and is very suitable for active carbon in granules or in rods.

According to a second variant of this second embodiment, the active carbon is in the form of powder and the coating is carried out by addition of the active carbon powder to the sol, then the mixture obtained is poured into molds. The molds thus filled are advantageously dried under an inert gaseous stream so as to remove the residual solvents before removing the blocks of core-shell material from the molds. This method can easily be transposed to the industrial scale.

In the two embodiments previously described, the silica shell, which is preferably functionalized, surrounding the active carbon core, in the form of nanoparticles or of a thin film, must have a small thickness and a mesoporosity so as to allow the pollutants to diffuse rapidly in the porous network and to reach the silica-active carbon interface. It is at this interface of the hybrid compound that a "mixed" environment promotes the trapping of the polar molecules that are trapped with difficulty or not at all by the active carbon alone or the silica alone.

Another subject of the invention is a core-shell hybrid material obtained by means of the coating method according to the invention described above. It is thus a core-shell hybrid material consisting of an active carbon core surrounded by a mesoporous sol-gel silica shell.

All the information and embodiments set out above in connection to the nature of the sol-gel material and of the active carbon are also valid for the core-shell hybrid material according to the invention. The core-shell hybrid material according to the invention is in particular characterized in that it contains an active carbon core, in particular of micrometric size, preferably with a large specific surface area of adsorption, in particular of 800 to 1500 $m^2/g$, the surface of which is covered with a shell made of mesoporous sol-gel silica. This shell is of a small thickness. Its mesoporosity allows pollutants to rapidly diffuse into the porous network and to reach the silica-active carbon interface. It is at this interface of the hybrid compound that a "mixed" environment promotes the trapping of the polar molecules that are trapped with difficulty or not at all by the active carbon alone or the silica alone. The (weight of silica/weight of active carbon) ratio determined by Differential Thermal Analysis (DTA) preferably ranges between 0.05 and 6, preferably between 0.05 and 2, more preferentially between 0.05 and 1 and more preferably between 0.05 and 0.2.

In a first embodiment, the shell of the core-shell hybrid material according to the invention consists of mesoporous sol-gel silica nanoparticles. These nanoparticles are advantageously spherical in shape, having in particular a diameter of from 20 to 400 nm and preferentially between 50 and 100 nm. The size of the silica nanoparticles can be determined by transmission electron microscopy. The (mass of silica/mass of active carbon) ratio determined by Differential Thermal Analysis (DTA) preferably ranges between 0.05 and 0.2. The core-shell hybrid material of this embodiment can be prepared according to the first embodiment of the method of the invention described above.

In a second embodiment, the shell of the core-shell hybrid material according to the invention consists of a thin film of mesoporous sol-gel silica. The core-shell hybrid material of this embodiment can be prepared according to the second embodiment of the method of the invention described above. The (mass of silica/mass of active carbon) ratio determined by Differential Thermal Analysis (DTA) preferably ranges between 0.05 and 0.2. However, in the case of hybrid materials synthesized by mixing the active carbon with a sol, this ratio is higher and ranges between 1 and 6, for example between 4 and 6.

The materials according to the invention have a particular application in the field of filtration, in particular filtration of air or water. The invention thus also relates to a filtering system, for example an air- or water-filtering system, comprising the core-shell hybrid material according to the invention.

Nonlimiting exemplary embodiments of the invention are described below.

BRIEF DESCRIPTION OF THE FIGURES

FIG. 2: (B) TEM image of the core-shell hybrid material of example 1, enlargement on the surface.

DETAILED DESCRIPTION

EXAMPLES

Figure 1:
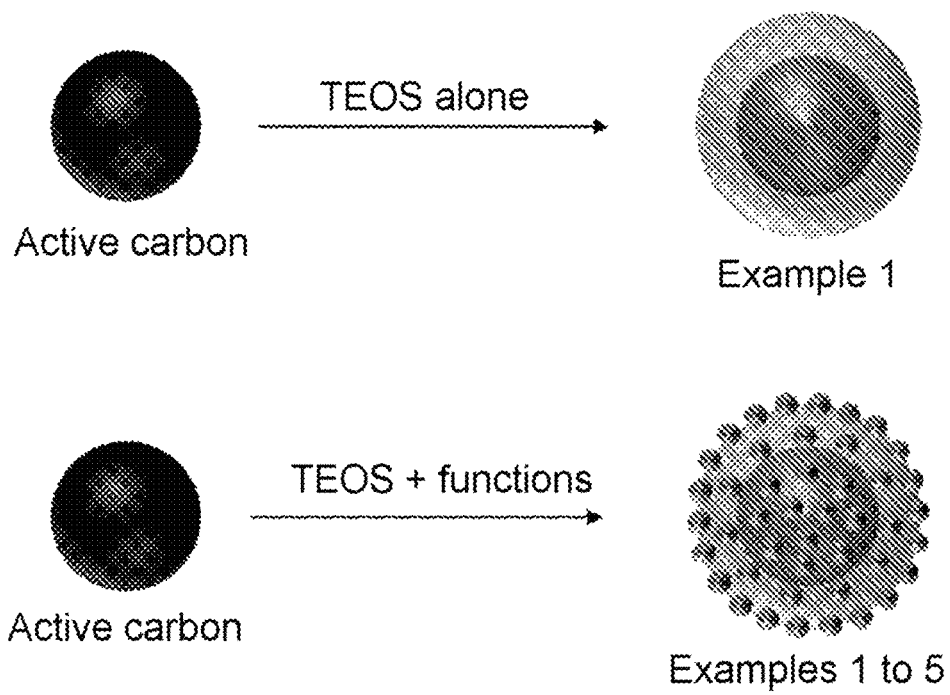
FIG. 1: Schematic representation of the synthesis of the core/shell materials.
Figure 2:
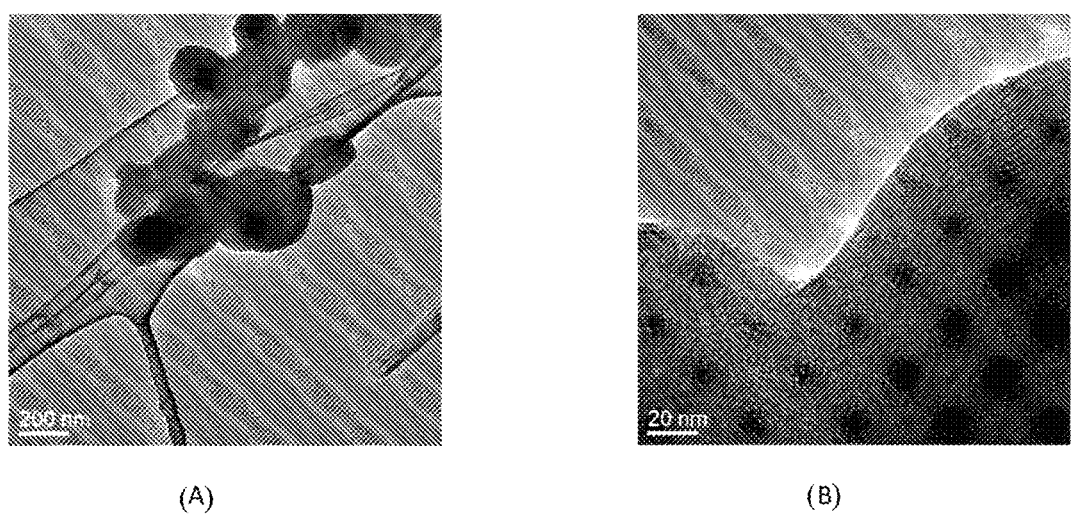
FIG. 2: (A) TEM image of the core-shell hybrid material of example 1.

A. Synthesis of Active Carbons Coated with Silica According to the First Embodiment Example 1: Synthesis of Non-Functionalized, Coated Active Carbons Reagents:

W35 active carbon (Sofralab), tetraethyl orthosilicate (TEOS, CAS: 78-10-4, molar mass=208.33 g/mol and density d=0.933), methanol (MeOH, CAS: 67-56-1, molar mass=32.04 g/mol and density d=0.791), cetyltrimethylammonium bromide (CTAB, CAS: 57-09-0, molar mass=364.45 g/mol), aqueous ammonia ($NH_4OH$, CAS: 1336-21-6, molar mass=35.05 g/mol and density d=0.9).

Procedure:

0.64 g of W35 active carbon, 0.29 g of CTAB and 150 ml of an aqueous $NH_4OH$ solution previously prepared at a concentration of 2.048 M are mixed in a flask. The solution is left to stir by magnetic stirring at ambient temperature for 1 h. 6.5 ml of ethanolic TEOS at a concentration of 1.025 M are then added dropwise and the solution is left to stir for a further hour at ambient temperature. The stirring is then stopped and the solution is left to mature overnight at 50° C. The solution is then recovered by centrifugation (12000 rpm for 12 min). The surfactant is removed by a succession of washing with hydrochloric acid and with ethanol, before being stored in the latter. Before use, the materials are recovered by centrifugation (12000 rpm for 12 min) then dried in an oven at 60° C. for 2 h.

Example 2: Synthesis of Active Carbons Coated with Silica Functionalized with Amine Groups Reagents:

W35 active carbon (Sofralab), tetraethyl orthosilicate (TEOS, CAS: 78-10-4, molar mass=208.33 g/mol and density d=0.933), methanol (MeOH, CAS: 67-56-1, molar mass=32.04 g/mol and density d=0.791), cetyltrimethylammonium bromide (CTAB, CAS: 57-09-0, molar mass=364.45 g/mol), aqueous ammonia ($NH_4OH$, CAS: 1336-21-6, molar mass=35.05 g/mol and density d=0.9), N-(2-aminoethyl)-3-(trimethoxysilyl)propylamine ($NH_2$-TMOS, CAS: 1760-24-3, molar mass=222.36 g/mol and density d=1.028).

Procedure:

0.64 g of W35 active carbon, 0.29 g of CTAB and 150 ml of an aqueous $NH_4OH$ solution previously prepared at a concentration of 2.048 M are mixed in a plastic flask. The solution is left to stir by magnetic stirring at ambient temperature for 1 h. 20 µl of $NH_2$-TMOS are then added, followed by 6.5 ml of ethanolic TEOS at a concentration of 1.025 M and the solution is left to stir for a further hour at ambient temperature. The stirring is then stopped and the solution is left to mature overnight at 50° C. The solution is then recovered by centrifugation (12 000 rpm for 12 min). The surfactant is removed by a succession of washing with hydrochloric acid and with ethanol before being stored in the latter. Before use, the materials are recovered by centrifugation (12 000 rpm for 12 min) then dried in an oven at 60° C. for 2 h.

Example 2 Supplement: Variation in the Amount of Amine Functions

According to the protocol of example 2, the amount of N-(2-aminoethyl)-3-(trimethoxysilyl)propylamine was used with various ratios according to table 1.

TABLE 1

| Ratio of $NH_2$—TMOS relative to TEOS | | |
|---|---|---|
| V $NH_2$—TMOS (µl) | n $NH_2$—TMOS (µmol) | nTEOS/n $NH_2$—TMOS |
| 10 | 42.73 | 157 |
| 20 | 85.47 | 79 |
| 50 | 213.67 | 31 |
| 100 | 427.34 | 15 |
| 200 | 854.68 | 8 |

Example 3: Synthesis of Active Carbons Coated with Silica Functionalized with Acid Groups Reagents:

W35 active carbon (Sofralab), tetraethyl orthosilicate (TEOS, CAS: 78-10-4, molar mass=208.33 g/mol and density d=0.933), methanol (MeOH, CAS: 67-56-1, molar mass=32.04 g/mol and density d=0.791), cetyltrimethylammonium bromide (CTAB, CAS: 57-09-0, molar mass=364.45 g/mol), aqueous ammonia ($NH_4OH$, CAS: 1336-21-6, molar mass=35.05 g/mol and density d=0.9), N-(trimethoxysilylpropyl)ethylenediamine triacetate, trisodium salt (COOH-TMOS, CAS: 128850-89-5, molar mass=462.42 g/mol and density d=1.26).

Procedure:

0.64 g of W35 active carbon, 0.29 g of CTAB and 150 ml of an aqueous NH$_4$OH solution previously prepared at a concentration of 2.048 M are mixed in a plastic flask. The solution is left to stir by magnetic stirring at ambient temperature for 1 h. 20 μl of COOH-TMOS are then added, followed by 6.5 ml of ethanolic TEOS at a concentration of 1.025 M and the solution is left to stir for a further hour at ambient temperature. The stirring is then stopped and the solution is left to mature overnight at 50° C. The solution is then recovered by centrifugation (12 000 rpm for 12 min). The surfactant is removed by a succession of washing with hydrochloric acid and with ethanol before being stored in the latter. Before use, the materials are recovered by centrifugation (12 000 rpm for 12 min) then dried in an oven at 60° C. for 2 h.

Example 4: Synthesis of Active Carbons Coated with Silica Functionalized with Aromatic Groups Reagents:

W35 active carbon (Sofralab), tetraethyl orthosilicate (TEOS, CAS: 78-10-4, molar mass=208.33 g/mol and density d=0.933), methanol (MeOH, CAS: 67-56-1, molar mass=32.04 g/mol and density d=0.791), cetyltrimethylammonium bromide (CTAB, CAS: 57-09-0, molar mass=364.45 g/mol), aqueous ammonia (NH$_4$OH, CAS: 1336-21-6, molar mass=35.05 g/mol and density d=0.9), trimethoxyphenylsilane (PhTMOS, CAS: 2996-92-1, molar mass=198.29 g/mol and density d=1.062).

Procedure:

0.64 g of W35 active carbon, 0.29 g of CTAB and 150 ml of an aqueous NH$_4$OH solution previously prepared at a concentration of 2.048 M are mixed in a plastic flask. The solution is left to stir by magnetic stirring at ambient temperature for 1 h. 20 μl of PhTMOS are then added, followed by 6.5 ml of ethanolic TEOS at a concentration of 1.025 M and the solution is left to stir for a further hour at ambient temperature. The stirring is then stopped and the solution is left to mature overnight at 50° C. The solution is then recovered by centrifugation (12 000 rpm for 12 min). The surfactant is removed by a succession of washing with hydrochloric acid and with ethanol before being stored in the latter. Before use, the materials are recovered by centrifugation (12 000 rpm for 12 min) then dried in an oven at 60° C. for 2 h.

Example 5: Synthesis of Active Carbons Coated with Silica Functionalized with Urea Groups Reagents:

W35 active carbon (Sofralab), tetraethyl orthosilicate (TEOS, CAS: 78-10-4, molar mass=208.33 g/mol and density d=0.933), methanol (MeOH, CAS: 67-56-1, molar mass=32.04 g/mol and density d=0.791), cetyltrimethylammonium bromide (CTAB, CAS: 57-09-0, molar mass=364.45 g/mol), aqueous ammonia (NH$_4$OH, CAS: 1336-21-6, molar mass=35.05 g/mol and density d=0.9), 3-(4-semicarbazidyl)propyltriethoxysilane (SCPTS, CAS: 106868-88-6, molar mass=279.41 g/mol and density d=1.08).

Procedure:

0.64 g of W35 active carbon, 0.29 g of CTAB and 150 ml of an aqueous NH$_4$OH solution previously prepared at a concentration between 1 and 3 mol·l$^{-1}$, preferentially 2.05 mol·l$^{-1}$, are mixed in a plastic flask. The solution is left to stir by magnetic stirring at ambient temperature for 1 h. 20 μl of SCPTS are then added, followed by 6.5 ml of ethanolic TEOS prepared at a concentration between 1 and 2 mol·l$^{-1}$, preferentially 1.025 mol·l$^{-1}$ and the solution is left to stir for a further hour at ambient temperature. The stirring is then stopped and the solution is left to mature overnight at 50° C. The solution is then recovered by centrifugation (12 000 rpm for 12 min). The surfactant is removed by a succession of washing with hydrochloric acid and with ethanol before being stored in the latter. Before use, the materials are recovered by centrifugation (12 000 rpm for 12 min) then dried in an oven at 60° C. for 2 h.

During the syntheses, 3-ureidopropyltriethoxysilane (UPTS, purity 50%, CAS: 23779-32-0) was also used as a precursor for the functionalization with urea groups.

B. Synthesis of Active Carbons Coated with Silica According to the Second Embodiment Example 6: Synthesis of Rod-Shaped Active Carbons Coated with Silica Functionalized with Amine Groups Reagents:

Rod-shaped Norit RBBA-3 active carbon (Sigma-Aldrich), tetramethyl orthosilicate (TMOS, CAS: 681-84-5, purity: 99%, molar mass=152.22 g/mol and density d=1.023), methanol (MeOH, CAS: 67-56-1, purity 99.9%, molar mass=32.04 g/mol and density d=0.791 g/cm$^3$), 3-aminopropyltriethoxysilane (APTES, CAS 919-30-2: purity 99%, molar mass=221.37 g/mol and density d=0.946). Ultrapure deionized water.

Procedure:

10.23 ml of TMOS and 0.5 ml of APTES are added to a 60 ml flask containing 14.22 ml of methanol. The mixture is left to stir in order to obtain a homogeneous solution. 5.05 ml of water are added to the mixture and the solution is vigorously stirred. The molar proportions of the mixture thus obtained are TMOS/APTES/MeOH/water=0.97/0.03/5/4. Since the sol gels after 8 min, the mixture is poured one to three times after 1 min onto rods of active carbon positioned on a sieve. The rods covered with a film of sol-gel material are dried in an oven at 80°.

Examples 7A and 7B: Synthesis of Rod-Shaped Active Carbons Coated with Silica Functionalized with Amine Groups Reagents:

Norit RBBA-3 active carbon (Sigma-Aldrich), tetramethyl orthosilicate (TMOS, CAS: 681-84-5, molar mass=152.22 g/mol and density d=1.023), ethanol (EtOH, CAS: 64-17-5, molar mass=46.07 g/mol and density d=0.789), 3-aminopropyltriethoxysilane (APTES, CAS 919-30-2: molar mass=221.37 g/mol and density d=0.946).

Procedure:

9.86 ml of TMOS and 0.99 ml of APTES are added to a 60 ml flask containing 14.13 ml of ethanol. The mixture is left to stir in order to obtain a homogeneous solution. 5.02 ml of water are added to the mixture and the solution is vigorously stirred. The molar proportions of the mixture thus obtained are TMOS/APTES/EtOH/water=0.94/0.06/5/4. Since the sol gels after 8 min, the mixture is poured after 1 min onto rods of active carbon positioned on a sieve (material 6A) (weight of active carbon 0.7428 g).

The remaining sol is left to mature for a further 2 min, after which time a further pouring is carried out onto new rods of active carbon (material 6B) (weight of active carbon 0.7315 g). The rods covered with a film of sol-gel material are dried in an oven at 80°.

C. Synthesis of Hybrid Active Carbons Coated with Silica Functionalized by Simple Mixing of a Sol and the Active Carbon According to the Second Embodiment

Example 8: Synthesis of Hybrid Materials by Mixing of Active Carbons with a Sol of Silicon Precursors, One of which is Functionalized with Acetoxy Groups Reagents:

Darco KG-B powdered active carbon (Sigma-Aldrich), tetramethyl orthosilicate (TMOS, CAS: 681-84-5, purity 99%, molar mass=152.22 g/mol and density d=1.023), methanol (MeOH, CAS: 67-56-1, purity 99.9%, molar mass=32.04 g/mol and density d=0.791), acetoxyethyltrimethoxysilane (AETMS, CAS: 72878-29-6, purity 95%, molar mass=250.36 g/mol and density d=0.983), ultrapure deionized water, aqueous ammonia solution at 28%.

Procedure:

10.29 ml of TMOS and 0.55 ml of AETMS are added to a 60 ml flask containing 14.13 ml of methanol. The mixture is left to stir in order to obtain a homogeneous solution. 4.73 ml of water are added to the mixture with stirring and 0.3 ml of an aqueous ammonia solution at 28% is added last. The active carbon (0.7514 g) is added 20 s later with vigorous stirring for 10 s, then the sol is poured into a honeycomb mold. The molar proportions of the mixture thus obtained are TMOS/AETMS/MeOH/water=0.98/0.02/5/4 with an $NH_4OH$ concentration of 0.148 M. After gelling, the mold is dried under an inert gas stream. After demolding, cylinder-shaped black granules with dimensions of 0.7(L)×0.3(diameter) cm are obtained.

Example 9: Synthesis of Hybrid Materials by Mixing Active Carbons with a Sol of Silicon Precursors, One of which is Functionalized with Acetoxy Groups The same synthesis as in example 8. The active carbon is in powder form, W35 active carbon (Sofralab) (0.7539 g)

Example 10: Synthesis of Hybrid Materials by Mixing Active Carbons with a Sol of Silicon Precursors, One of which is Functionalized with Glycidyloxy Groups Reagents:

Darco KG-B powdered active carbon (Sigma-Aldrich), tetramethyl orthosilicate (TMOS, CAS: 681-84-5, purity 99%, molar mass=152.22 g/mol and density d=1.023), MeOH (CAS: 67-56-1, purity 99.9%, molar mass=32.04 g/mol and density d=0.791), 3-glycidyloxypropyltriethoxysilane (GPTES, CAS: 2602-34-8, molar mass=278.42 g/mol and density d=1.004), ultrapure deionized water, aqueous ammonia solution at 28%.

Procedure:

10.25 ml of TMOS and 0.59 ml of GPTES are added to a 60 ml flask containing 14.13 ml of methanol. The mixture is left to stir in order to obtain a homogeneous solution. 4.73 ml of water are added to the mixture with stirring and 0.3 ml of an aqueous ammonia solution at 28% is added last. The active carbon (0.7505 g) is added 20 s later with vigorous stirring for 10 s, then the sol is poured into a honeycomb mold. The molar proportions of the mixture thus obtained are TMOS/GPTES/MeOH/water=0.967/0.023/5/4 with an $NH_4OH$ concentration of 0.148 M. After gelling, the mold is dried under an inert gas stream. After demolding, cylinder-shaped black granules with dimensions of 0.7(L)×0.3(diameter) cm are obtained.

Example 11: Synthesis of Hybrid Materials by Mixing Active Carbons with a Sol of Silicon Precursors, One of which is Functionalized with Glycidyloxy Groups Same synthesis as in example 10. The active carbon is in this case in the form of a powder, W35 active carbon (Sofralab) (0.7527 g).

Example 12: Synthesis of Hybrid Materials by Mixing Active Carbons with a Sol of Silicon Precursors, One of which is Functionalized with Amide and Amine Groups Reagents:

Darco KG-B powdered active carbon (Sigma-Aldrich), tetramethyl orthosilicate (TMOS, purity 99%, CAS: 681-84-5, molar mass=152.22 g/mol and density d=1.023), MeOH (CAS: 67-56-1, purity 99.9%, molar mass=32.04 g/mol and density d=0.791), 3-(4'-semicarbazido)propyltriethoxysilane (SCPTS), CAS: 106868-88-6, purity 95%, molar mass=279.41 g/mol and density d=1.08), ultrapure deionized water, aqueous ammonia solution at 28%.

Procedure:

10.27 ml of TMOS and 0.56 ml of SCPTS are added to a 60 ml flask containing 14.14 ml of methanol. The mixture is left to stir in order to obtain a homogeneous solution. 4.73 ml of water are added to the mixture with stirring and 0.3 ml of an aqueous ammonia solution at 28% is added last. The active carbon (0.7506 g) is added 20 s later with vigorous stirring for 10 s, then the sol is poured into a honeycomb mold. The molar proportions of the mixture thus obtained are TMOS/SCPTS/MeOH/water=0.977/0.023/5/4 with an $NH_4OH$ concentration of 0.148 M. After gelling, the mold is dried under an inert gas stream. After demolding, cylinder-shaped black granules with dimensions of 0.7(L)×0.3(diameter) cm are obtained.

Example 13: Synthesis of Hybrid Materials by Mixing Active Carbons with a Sol of Silicon Precursors, One of which is Functionalized with Amide and Amine Groups The same synthesis as in example 12. The active carbon is in this case in powder form, W35 active carbon (Sofralab) (0.7507 g).

Example 14: Synthesis of Hybrid Materials by Mixing Active Carbons with a Sol of the Silicon Precursors, One of which is Functionalized with Aromatic Groups (PhTMOS)

Reagents:

Darco KG-B powdered active carbon (Sigma-Aldrich), tetramethyl orthosilicate (TMOS, purity 99%, CAS: 681-84-5, molar mass=152.22 g/mol and density d=1.023), MeOH (CAS: 67-56-1, purity 99.9%, molar mass=32.04 g/mol and density d=0.791), PhTMOS (CAS: 2996-92-1, purity 98%, molar mass=198.29 g/mol and density d=1.062 g/cm³), ultrapure deionized water, aqueous ammonia solution at 28%.

Procedure:

10.27 ml of TMOS and 0.4 ml of PhTMOS are added to a 60 ml flask containing 14.25 ml of methanol. The mixture is left to stir in order to obtain a homogeneous solution. 4.78 ml of water are added to the mixture with stirring and 0.3 ml of an aqueous ammonia solution at 28% is added last. The active carbon (0.75 g) is added 20 s later with vigorous stirring for 10 s, then the sol is poured into a honeycomb mold. The molar proportions of the mixture thus obtained are TMOS/PhTMOS/MeOH/water=0.977/0.023/5/4 with an $NH_4OH$ concentration of 0.148 M. After gelling, the mold is dried under an inert gas stream. After demolding, cylinder-shaped black granules with dimensions of 0.7(L)×0.3(diameter) cm are obtained.

Example 15: Synthesis of Hybrid Materials by Mixing Active Carbons with a Sol of Silicon Precursors, One of which is Functionalized with Aromatic Groups (PhTEOS)

Reagents:

Darco KG-B powdered active carbon (Sigma-Aldrich), tetramethyl orthosilicate (TMOS, purity 99%, CAS: 681-84-5, molar mass=152.22 g/mol and density d=1.023), MeOH (CAS: 67-56-1, purity 99.9%, molar mass=32.04 g/mol and density d=0.791), PhTEOS (CAS: 780-69-8, purity 98%, molar mass=240.37 g/mol and density d=0.996 g/cm³), ultrapure deionized water, aqueous ammonia solution at 28%.

Procedure:

10.23 ml of TMOS and 0.52 ml of PhTEOS are added to a 60 ml flask containing 14.2 ml of methanol. The mixture is left to stir in order to obtain a homogeneous solution. 4.75 ml of water are added to the mixture with stirring and 0.3 ml of an aqueous ammonia solution at 28% is added last. The active carbon (0.75 g) is added 20 s later with vigorous stirring for 10 s, then the sol is poured into a honeycomb mold. The molar proportions of the mixture thus obtained are TMOS/PhTEOS/MeOH/water=0.977/0.023/5/4 with an $NH_4OH$ concentration of 0.148 M. After gelling, the mold is dried under an inert gas stream. After demolding, cylinder-shaped black granules with dimensions of 0.7(L)×0.3(diameter) cm are obtained.

Example 16: Synthesis of Hybrid Materials by Mixing Active Carbons with a Sol of Silicon Precursors, One of which is Functionalized with Amine Groups Reagents:

Darco KG-B powdered active carbon (Sigma-Aldrich), tetramethyl orthosilicate (TMOS, purity 99%, CAS: 681-84-5, molar mass=152.22 g/mol and density d=1.023), MeOH (CAS: 67-56-1, purity 99.9%, molar mass=32.04 g/mol and density d=0.791), 3-aminopropyltriethoxysilane (APTES, CAS: 919-30-2, molar mass=221.37 g/mol and density d=0.946), ultrapure deionized water.

Procedure:

17.07 ml of TMOS and 0.833 ml of APTES are added to a 100 ml flask containing 23.67 ml of methanol. The mixture is left to stir in order to obtain a homogeneous solution. 8.43 ml of water are added to the mixture with stirring. The active carbon (0.5152 g) is added 1 min later with vigorous stirring for 30 s, then the sol is poured into a honeycomb mold. The molar proportions of the mixture thus obtained are TMOS/APTES/MeOH/water=0.977/0.023/5/4. After gelling, the mold is dried under an inert gas stream. After demolding, cylinder-shaped black granules with dimensions of 0.6(L)×0.3(diameter) cm are obtained.

Example 17: Synthesis of Hybrid Materials by Mixing Active Carbons with a Sol of Silicon Precursors, One of which is Functionalized with Amine Groups Same synthesis as in example 16. The active carbon is in this case in powder form, W35 active carbon (Sofralab) (0.5159 g).

Example 18: Synthesis of Hybrid Materials by Mixing Active Carbons with a Sol of Silicon Precursors, One of which is Functionalized with Primary Amine Groups (APTES)

Reagents:

Norit W35 powdered active carbon (Cabot), tetramethyl orthosilicate (TMOS, purity 99%, CAS: 681-84-5, molar mass=152.22 g/mol and density d=1.023), methanol (MeOH, CAS: 67-56-1, molar mass=32.04 g/mol and density d=0.791), 3-aminopropyltriethoxysilane (APTES, CAS: 919-30-2, purity 99%, molar mass=221.37 g/mol and density d=0.946), ultrapure deionized water.

Procedure:

30.45 g of W35 active carbon, 64.727 ml of MeOH, 45.234 ml of TMOS and 3.782 ml of APTES are mixed in a 300 ml Erlenmeyer flask. The solution is plunged into a bath of ethanol at −25° C. and stirred vigorously for 2 min 23.059 ml of $H_2O$ are then added. The solution is maintained at −25° C. with vigorous stirring for 1 min. The sol is then poured into a honeycomb mold. The molar ratio of the mixture of the precursors and solvents TMOS/APTES/MeOH/$H_2O$ is 0.95/0.05/5/4. The final content of W35 in the sol is 222.6 g/l. The mold is dried under an inert gas stream. After demolding, cylinder-shaped black granules with dimensions of 0.95(L)×0.25(diameter) cm (example 18p) or 0.95(L)*0.5(diameter) cm (example 18) are obtained depending on the mold sizes.

Example 19: Synthesis of Hybrid Materials by Mixing Active Carbons with a Sol of Silicon Precursors, One of which is Functionalized with Primary Amine Groups (APTES)

Same procedure as in example 18. The molar ratio of the mixture of the precursors TMOS/APTES/MeOH/$H_2O$ is 0.90/0.1/5/4. The corresponding volumes are respectively 42.419/7.487/64.071/22.825 ml. The W35 content in the sol is 222.6 g/l.

Example 20: Synthesis of Hybrid Materials by Mixing Active Carbons with a Sol of Silicon Precursors, One of which is Functionalized with Primary Amine Groups (APTES)

Same procedure as in example 18. The molar ratio of the mixture of the precursors TMOS/APTES/MeOH/$H_2O$ is 0.85/0.15/5/4. The corresponding volumes are respectively 39.661/11.118/63.428/22.596 ml. The W35 content in the sol is 222.6 g/l.

Example 21: Synthesis of Hybrid Materials by Mixing Active Carbons with a Sol of Silicon Precursors, One of which is Functionalized with Primary Amine Groups (APTES)

Same procedure as in example 18. The molar ratio of the mixture of the precursors TMOS/APTES/MeOH/$H_2O$ is 0.95/0.05/5/4. The corresponding volumes are respectively 45.234 ml, 3.782 ml, 64.727 ml and 23.059 ml. The final content of W35 in the sol is 148.4 g/l.

Example 22: Synthesis of Hybrid Materials by Mixing Carbons with a Sol of Silicon Precursors, One of which is Functionalized with Primary and Secondary Amine Groups ($NH_2$-TMOS)

Reagents:
Norit W35 powdered active carbon (Cabot), tetramethyl orthosilicate (TMOS, purity 99%, CAS: 681-84-5, molar mass=152.22 g/mol and density d=1.023), methanol (MeOH, CAS: 67-56-1, molar mass=32.04 g/mol and density d=0.791), N-[3-(trimethoxysilyl)propyl]ethylenediamine ($NH_2$-TMOS, CAS: 1760-24-3, purity 97%, molar mass=222 g/mol and density d=1.028), ultrapure deionized water.

Procedure:
30.389 g of W35 active carbon, 64.727 ml of MeOH, 45.234 ml of TMOS and 3.496 ml of $NH_2$-TMOS are mixed in a 300 ml Erlenmeyer flask. The solution is plunged into a bath of ethanol at −30° C. and stirred vigorously for 2 min 23.059 ml of $H_2O$ are then added. The solution is maintained at −30° C. with vigorous stirring for 1 min. The sol is then poured into a honeycomb mold. The molar ratio of the mixture of the precursors and of the solvents TMOS/$NH_2$-TMOS/MeOH/$H_2O$ is 0.95/0.05/5/4. The final content of W35 in the sol is 222.6 g/l. The mold is dried under an inert gas stream. After demolding, cylinder-shaped black granules with dimensions of 0.95(L)×0.25(diameter) cm (example 22p) or 0.95(L)×0.5(diameter) cm (example 22) are obtained depending on the mold sizes.

Example 23: Synthesis of Hybrid Materials by Mixing Active Carbons with a Sol of Silicon Precursors, One of which is Functionalized with Urea Groups (UPTS)

Reagents:
Norit W35 powdered active carbon (Cabot), tetramethylorthosilicate (TMOS, purity 99%, CAS: 681-84-5, molar mass=152.22 g/mol and density d=1.023), methanol (MeOH, CAS: 67-56-1, molar mass=32.04 g/mol and density d=0.791), 3-ureidopropyltriethoxysilane (UPTS, purity 50%, CAS: 23779-32-0, molar mass=264.4 and density d=0.91), aqueous ammonia solution at 28%, ultrapure deionized water.

Procedure:
8.499 g of W35 active carbon, 17.366 ml of MeOH, 12.136 ml of TMOS and 2.494 ml of UPTS are mixed in a 60 ml flask. The solution is plunged into a bath of ethanol at −25° C. and stirred vigorously for 2 min. 6.187 ml of $H_2O$ and 0.382 ml of an aqueous ammonia solution at 28% are then added. The solution is maintained at −25° C. with vigorous stirring for 1 min. The sol is then poured into a honeycomb mold. The molar ratio of the mixture of the precursors and the solvents TMOS/UPTS/MeOH/$H_2O$ is 0.95/0.05/5/4 with an $NH_4OH$ concentration of 0.148 M. The final content of W35 in the sol is 222.6 g/l. The mold is dried under an inert gas stream. After demolding, cylinder-shaped black granules with dimensions of 0.95(L)×0.5(diameter) cm are obtained.

Example 24: Synthesis of Hybrid Materials by Mixing Active Carbons with a Sol of Silicon Precursors, One of which is Functionalized with Primary Amine Groups (APTES)

Same synthesis as in example 18. The active carbon is in this case Darco KB-G powdered carbon (CAS: 7440-44-0, Sigma-Aldrich, ref: 675326-250G). The molar ratio of the mixture of the precursors TMOS/APTES/MeOH/$H_2O$ is 0.95/0.05/5/4. The corresponding volumes are respectively 45.234 ml, 3.782 ml, 64.727 ml and 23.059 ml. The Darco KB-G content in the sol is 222.6 g/l. After demolding, cylinder-shaped black granules with dimensions of 0.95(L)× 0.25(diameter) cm (example 24p) or 0.95(L)×0.5(diameter) cm (example 24) are obtained depending on the mold sizes.

D. Characterization of the Materials

Transmission Electron Microscopy

In order to demonstrate the fact that the active carbon is entirely coated with (encapsulated in) a layer of nanoporous sol-gel material, the materials prepared in examples 1 to 5 were characterized by transmission electron microscopy (TEM).

The TEM grids are prepared in the following way: 1 mg of materials is suspended in 1 ml of ethanol, then vortexed for a few seconds. 10 µl of solution are deposited on a grid, then the grid is left to dry in the open air for a few minutes before it is used.

Figure 3:
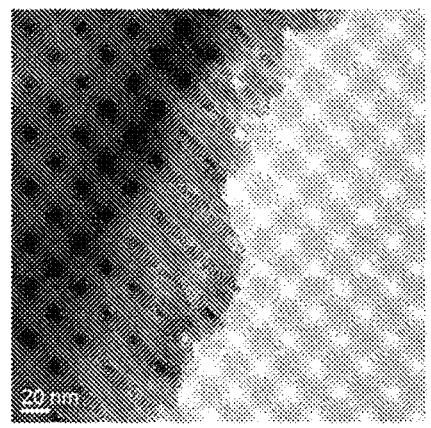
FIG. 3: TEM image of W35 active carbon. Enlargement on the surface.
Figure 4:
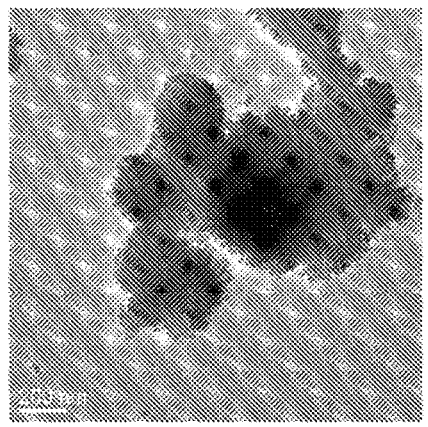
FIG. 4: (A) TEM image of the core-shell hybrid material of example 2. (B) TEM image of the core-shell hybrid material of example 2. Enlargement on the surface.
Figure 4:
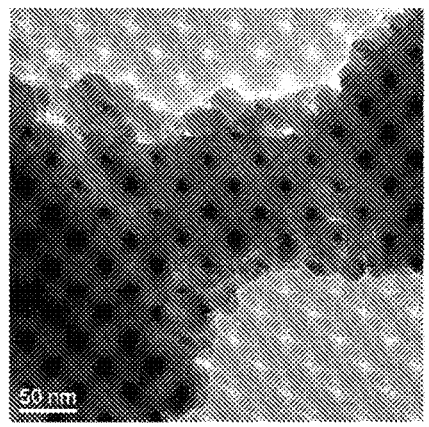
Figure 5:
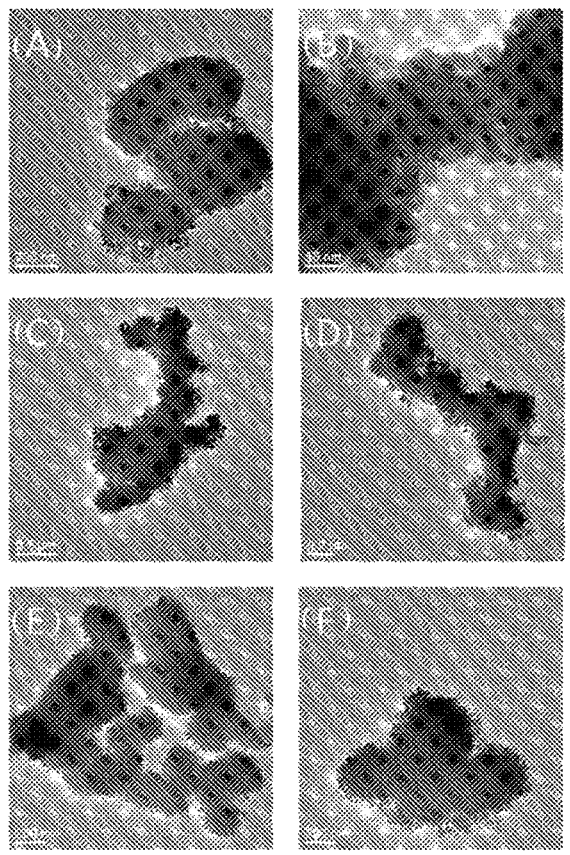
FIG. 5: TEM images of the core-shell hybrid materials of the example 2 supplement with various proportions of $NH_2$-TMOS: (A) 10 µl, (B) enlargement of the material prepared with 10 µl, (C) 20 µl, (D) 50 µl, (E) 100 µl, (F) 200 µl.
Figure 6:
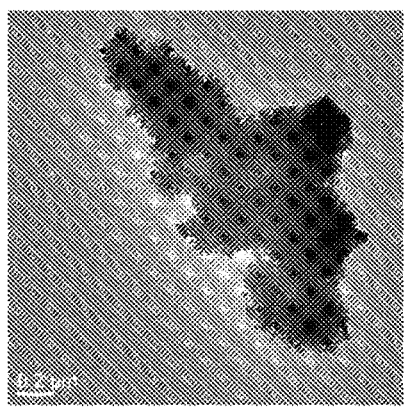
FIG. 6: TEM image of the core-shell hybrid material of example 3.
Figure 7:
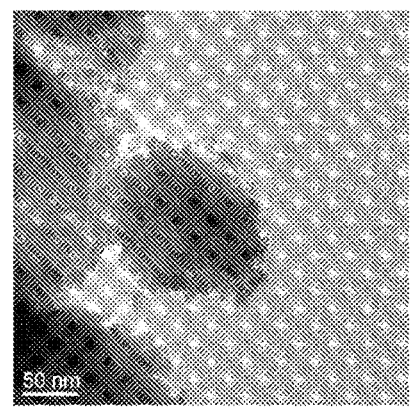
FIG. 7: TEM image of the core-shell hybrid material of example 4.
Figure 8:
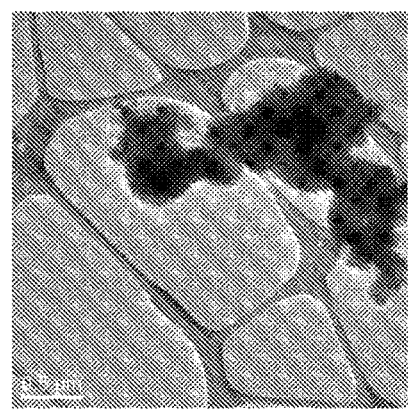
FIG. 8: TEM image of the core-shell hybrid material of example 5.

The TEM images of the W35 active carbon (FIG. 3) and of the various materials synthesized in examples 1 to 5 show that the active carbon is entirely covered with the sol-gel material, thus demonstrating the obtaining of a core-shell hybrid material consisting of an active carbon core surrounded by a sol-gel material (FIGS. 2A, 2B, 4A, 4B, 5, 6, 7 and 8).

The TEM images of the active carbon encapsulated in various functionalized sol-gel silicas show that the addition of a silica co-precursor allows the adhesion of silica nanoparticles around the materials in addition to the covering thereof by said silica.

Scanning electron microscopy (SEM) is a powerful technique for observing the topography of surfaces. It is based principally on the detection of the secondary electrons emerging from the surface under the impact of a very thin pencil-beam of primary electrons which scans the surface observed and makes it possible to obtain images with a separating power often less than 5 nm and a great field depth. The instrument makes it possible to form a quasi-parallel, very thin (down to a few nanometers), pencil-beam of electrons highly accelerated by adjustable voltages of 0.1 to 30 keV, to focus it on the zone to be examined and to gradually scan it. Appropriate detectors make it possible to collect significant signals during the scanning of the surface and to form various significant images thereof. The images of the samples were produced with the "Ultra 55" SEM from Zeiss. Conventionally, the samples are observed directly without particular deposit (metal, carbon).

Figure 9:
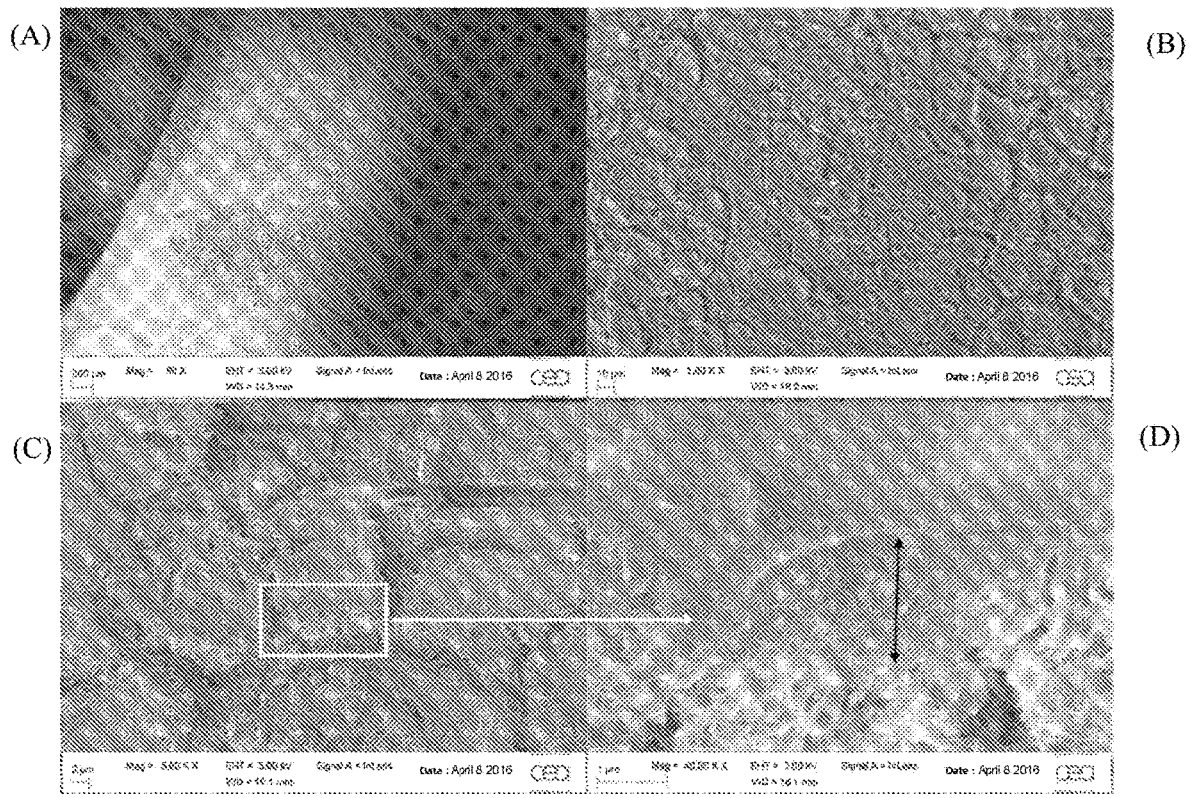
FIG. 9: SEM image of a rod of AC (Darco-KGB) coated with hybrid sol-gel of example 6. (A) view of the rod, (B) zoom on its surface, (C) enlargement of the surface, (D) estimation of the sol-gel thickness.

FIG. 9 shows the SEM images of a rod of active carbon covered with a thin film of sol-gel material and the successive enlargements of the surface showing the cracks in the layer of silicate.

Infrared Spectroscopy

Figure 10:
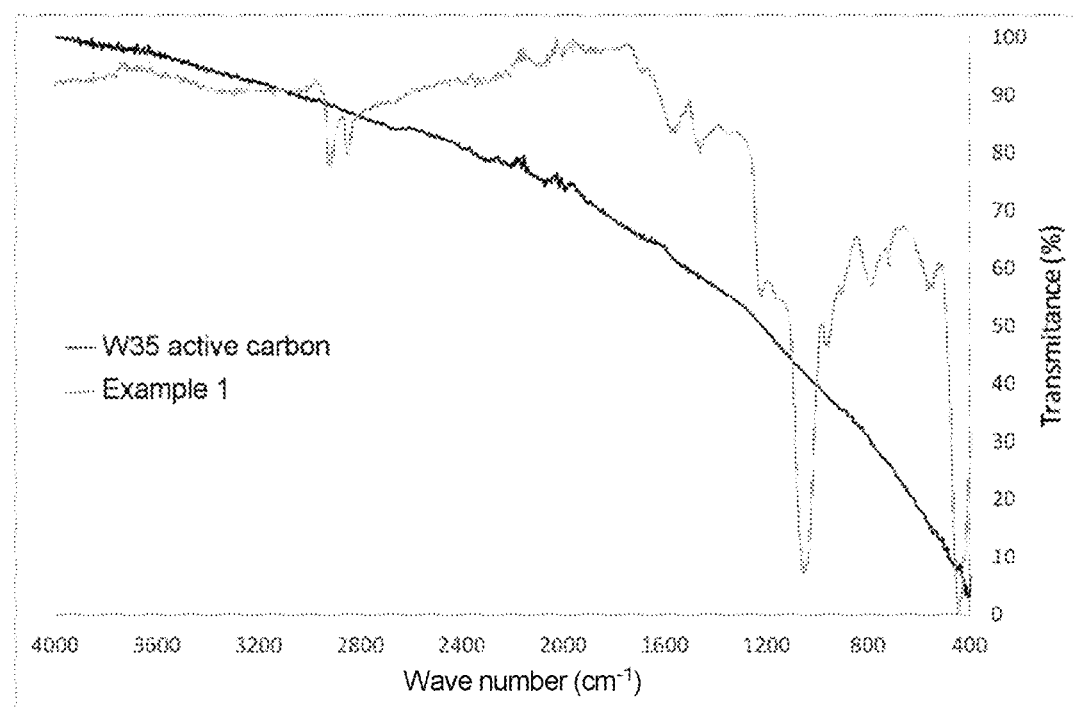
FIG. 10: Infrared spectrum of the hybrid material of example 1 compared with active carbon alone.
Figure 11:
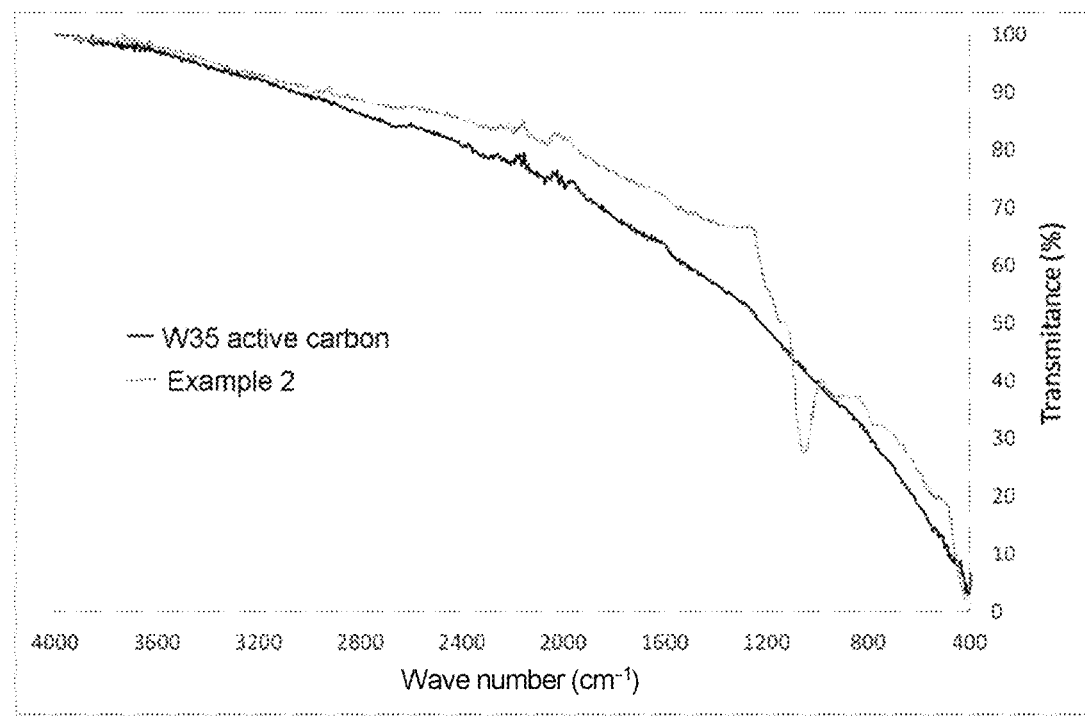
FIG. 11: Infrared spectrum of the hybrid material of example 2 compared with active carbon alone.
Figure 12:
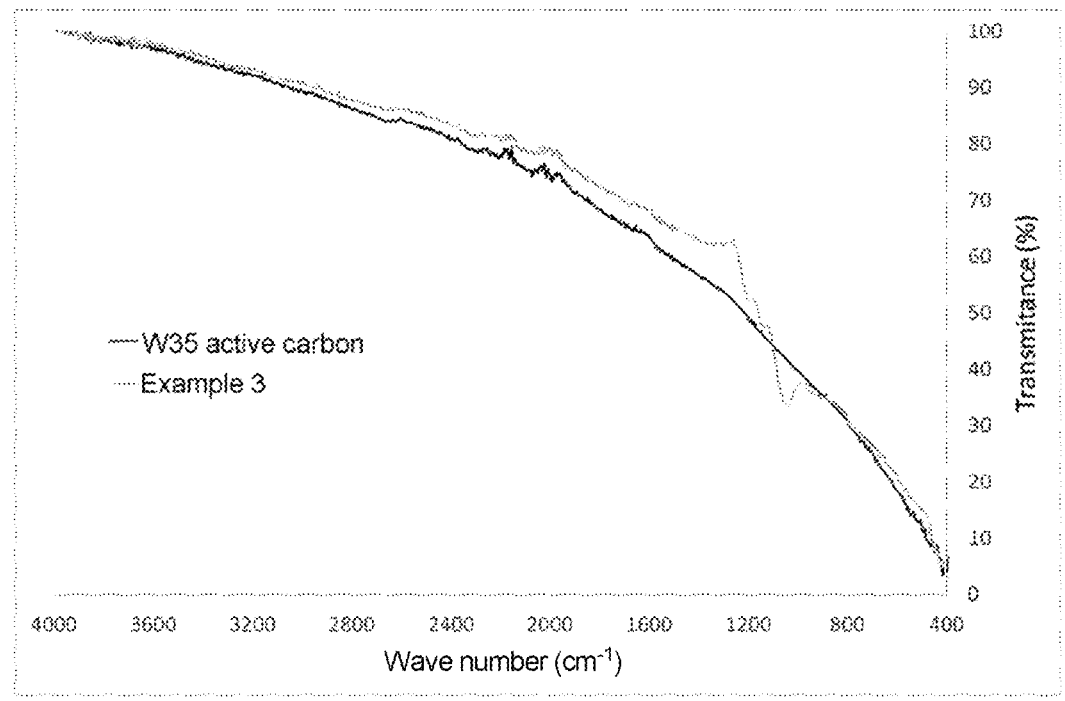
FIG. 12: Infrared spectrum of the hybrid material of example 3 compared with active carbon alone.
Figure 13:
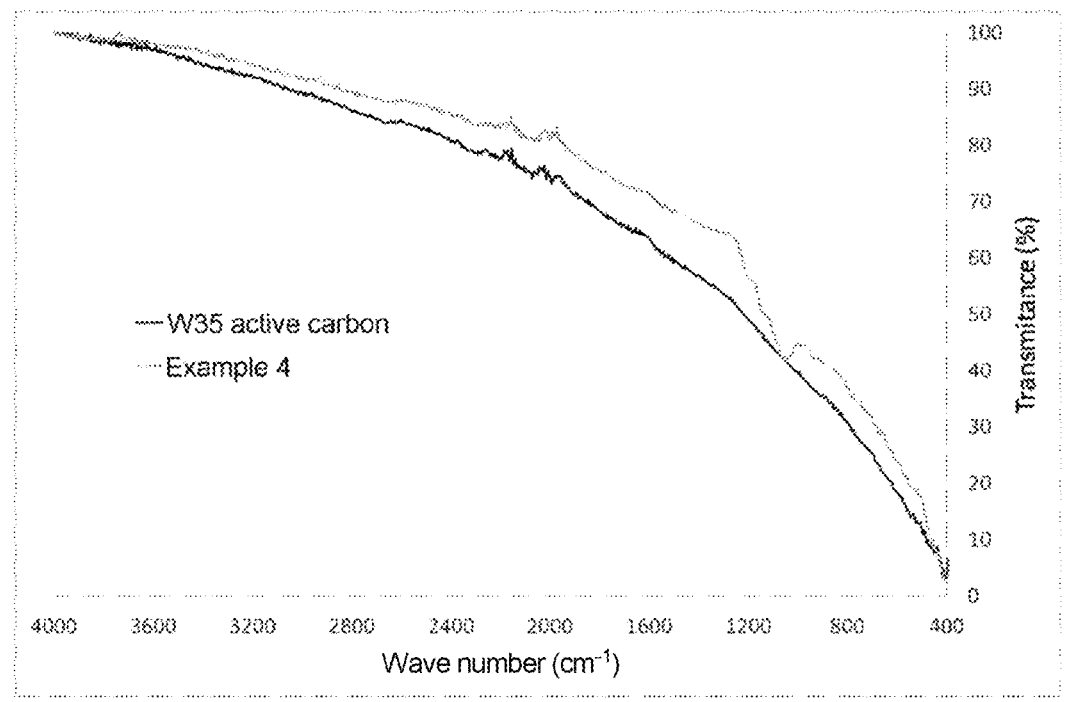
FIG. 13: Infrared spectrum of the hybrid material of example 4 compared with active carbon alone.

Fourier Transform InfraRed spectroscopy (FTIR) is an analysis technique which is useful for determining, identifying or confirming the structure of known or unknown products. An infrared spectrum in fact makes it possible to easily demonstrate the presence of certain functional groups, and can serve as a "spectroscopic identity card" for a molecule or material. The ATR (Attenuated Total Reflectance) module is installed on the IR spectrometer (FIG. 10). The principle consists in bringing a crystal (ZnSe or diamond) into contact with the sample to be analyzed. The IR beam propagates in the crystal; if the refractive index of the crystal is greater than that of the sample, then the beam undergoes total reflections beyond a certain angle of incidence at the sample/crystal interface with the exception of a wave, referred to as evanescence wave, which emerges from the crystal and is absorbed by the sample. It is this evanescent wave that is responsible for the IR spectrum observed. The penetration depth is about 1 to 2 micrometers, which thus provides surface information. This is particularly advantageous for the analysis of pure samples (without dilution in a KBr matrix) since the risk of seeing the peaks saturate is very low. Furthermore, at low energies, the resolution is in general better than for a "conventional" transmission spectrum. The IR spectra were produced with the "Alpha-P" FTIR-ATR module from Bruker.

The infrared spectra of the various materials synthesized in examples 1 to 4 clearly show the presence of the silica in the materials via the peak at 1050-1100 $cm^{-1}$ corresponding to the Si—O bond stretching vibrations (FIGS. 10-13).

Differential Thermal Analysis

Thermogravimetric analysis consists in placing a sample in an oven under a controlled atmosphere and in measuring the variations in mass as a function of temperature. The gradual increase in the temperature, or temperature gradient, induces evaporation of the solvents and unique degradation of each of the organic constituents of the sample. The decrease in mass corresponding to these losses makes it possible to quantify the proportions of each constituent in the material. An instrument of TGA-92-1750 type of the Setaram brand is used for a measurement in duplicate of each sample. The protocol is the following: approximately 10 mg of monolith are finally ground, weighed and deposited in the balance of the instrument. The whole thing is introduced into the oven and placed under a flow of synthetic air at 110 ml·$min^{-1}$ of F.I.D. quality. The oven, initially at 40° C., is heated to 1500° C. with a gradient of 50° C.·$min^{-1}$. After a stationary phase for 10 minutes at 1500° C., the temperature is decreased again to ambient temperature at the rate of −90° C.·$min^{-1}$.

Figure 14:
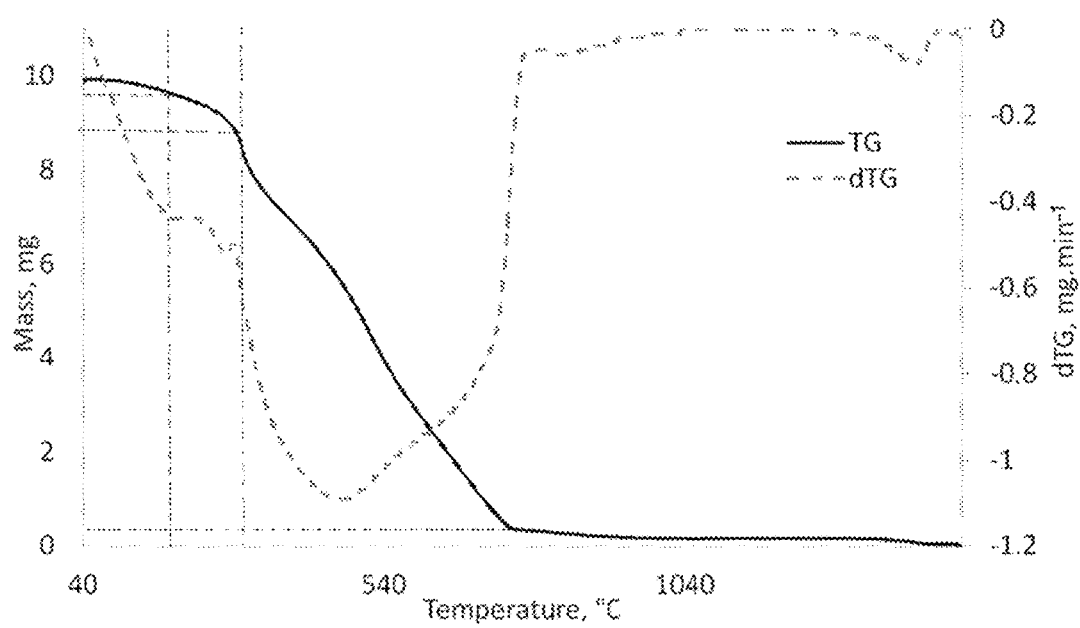
FIG. 14: Differential thermal analysis of the product of example 6. The sample is heated from 40° C. to 1500° C. at the rate of 50° C./min. The successive slope variations indicate the successive weight losses of the residual water, of the aminopropyl chains of the functionalized material, of the active carbon and, last, the silica.

FIG. 14 shows the TGA of example 6. From the losses of material at various temperatures ($H_2O$, aminopropyl chains, AC), it is possible to deduce the mass of the AC and of the silicate, the proportions of which are 85.4% and 14.6%, respectively, for the AC and the functionalized silica.

For the material of example 22, the thermogravimetric analysis was carried out in the following way. The sample was heated from 25° C. to 700° C. Four temperature stationary phases were established at 100, 250, 400 and 700° C. and the loss of mass is monitored as a function of time. The variations in the slope indicate the successive losses of mass of the residual water, of the organic chains of the functionalized silicate and of the active carbon. The residual mass is that of the nonfunctionalized silica.

Figure 36:
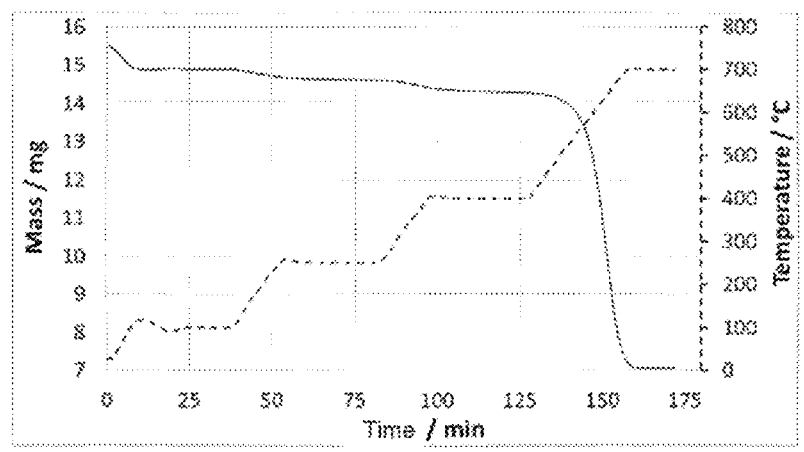
FIG. 36: Thermogravimetric analysis of the material of example 22.

The first temperature stationary phase at 100° C. is established so as to make it possible to quantify the loss of water, corresponding to the interstitial water present in the silicates. The loss of mass between 200° C. and 400° C. corresponds to that of the organic chain of the functionalized silicate and represents 3.3%. The loss of mass between 400° C. and 700° C. corresponds to that of the AC. Thus, for the composite material of example 22 prepared with 222.6 g/l of AC in the sol, the dry final material contains 53% of AC and 47% of silica. The TGA of the material of example 22 is represented in FIG. 36.

Porosity Measurements

The nitrogen adsorption isotherms at the temperature of liquid nitrogen were produced for examples 18, 20, 21, 22, 23 and 24. For the analysis of the porosity properties, the density functional theory (DFT) is applied. For a "pure" active carbon, the usual analytical model represents the pores of the material as interconnected slits (carbon-slit model). Likewise for the "pure" silicates, the usual analytical model represents the pores as interconnected cylinders. Given the composite nature of the material, the analytical models chosen are by way of comparison: "cylindrical carbon NLDFT (Non local density functional theory)" and "cylindrical silica DFT". The measurement of the BET specific surface area is also given. The results of the analyses are presented in table 2.

The percentage of micropores of the materials according to the invention is due to the presence of the active carbon which itself is microporous whereas the sol-gel silica which surrounds it is mesoporous.

TABLE 2

| Sample | Formulation | BET $S_{ads}$ ($m^2$/g) | Cylindrical carbon NLDFT $S_{ads}$ ($m^2$/g) $V_{pore}$ ($cm^3$/g) % of µpores | Cylindrical silica DFT $S_{ads}$ ($m^2$/g) $V_{pore}$ ($cm^3$/g) % of µpores |
|---|---|---|---|---|
| Example 18 | TMOS/APTES/MeOH/$H_2O$ 0.95/0.05/5/4 AC W35: 222.6 g/l | 655 | 774 0.47 63.0 | 870 0.47 63.4 |
| Example 18 without active carbon | TMOS/APTES/MeOH/$H_2O$ 0.95/0.05/5/4 | 569 | | 442 0.54 0/100 |
| Example 20 | TMOS/APTES/MeOH/$H_2O$ 0.85/0.15/5/4 AC W35: 222.6 g/l | 651 | 776 0.48 63.8 | 871 0.48 62.3 |
| Example 21 | TMOS/APTES/MeOH/$H_2O$ 0.95/0.05/5/4 AC W35: 148.4 g/l | 984 | 903 0.92 15.4 | 842 0.91 15.6 |
| Example 20 without active carbon | TMOS/APTES/MeOH/$H_2O$ 0.85/0.15/5/4 | 443 | | 337 0.40 0/100 |
| Example 22 | TMOS/TMPED/MeOH/$H_2O$ 0.95/0.05/5/4 AC W35: 222.6 g/l | 913 | 945 1.03 28.0 | 959 1.02 32.1 |
| Example 23 | TMOS/UPTS/MeOH/$H_2O$ 0.95/0.05/5/4 AC W35: 222.6 g/l | 737 | 868 0.52 62.0 | 950 0.52 60.1 |
| Example 23 without active carbon | TMOS/UPTS/MeOH/$H_2O$ 0.97/0.03/5/4 | 583 | | 581 0.78 23.2/76.8 |
| Example 24 | TMOS/APTES/MeOH/$H_2O$ 0.95/0.05/5/4 Darco KB-G AC: 222.6 g/l | 1426 | 1380 1.46 18.5 | 1290 1.44 17.1 |
| NORIT W35 AC | 8< pH suspension <9 | 875* | — | — |
| NORIT | | 707 | 961 | — |

TABLE 2-continued

| Sample | Formulation | BET $S_{ads}$ (m$^2$/g) | Cylindrical carbon NLDFT $S_{ads}$ (m$^2$/g) $V_{pore}$ (cm$^3$/g) % of μpores | Cylindrical silica DFT $S_{ads}$ (m$^2$/g) $V_{pore}$ (cm$^3$/g) % of μpores |
|---|---|---|---|---|
| RBAA-3 | | | 0.44 | |
| AC | | | 65.8 | |
| Darco | pH = 2.2 | | 1469 [¥] | — |
| KB-G | | | 1.25 [¥] | |
| AC | | | 0 [¥] | |

*given by supplier,
[¥] see reference [20]

E. Application Examples

Application Example 1: Adsorption of Atrazine by the Materials

Atrazine was chosen as first pollutant studied because of its very good adsorption by carbon. The idea was to compare the hybrid composite materials with active carbon. The adsorption capacity of the materials was determined on the basis of the suspension thereof in solutions of pollutants and the study of the supernatant over time. For this, 8 mg of materials are deposited in a plastic flask. 60 ml of an aqueous solution containing atrazine at 14 mg/l are added and the solution is stirred at ambient temperature. Aliquots of 6 ml are taken over time and are centrifuged to remove the traces of materials, and the supernatant solutions are studied by UV spectroscopy.

Below is the list of materials that were used:

| | |
|---|---|
| W35 | Active carbon |
| SiO$_2$ | Silica nanoparticles |
| W35 + SiO$_2$ | Mixture of active carbon and of silica nanoparticles |
| Example 1 | Nonfunctionalized hybrid |
| Example 2 | Hybrid functionalized with amine groups |
| Example 3 | Hybrid functionalized with acid groups |
| Example 4 | Hybrid functionalized with aromatic groups |
| Example 5 | Hybrid functionalized with urea groups |
| Example 13 | Hybrid functionalized with urea groups, prepared without surfactant |
| Example 14 | Hybrid functionalized with aromatic groups, prepared without surfactant |
| Example 17 | Hybrid functionalized with amine groups, prepared without surfactant |

Figure 15:
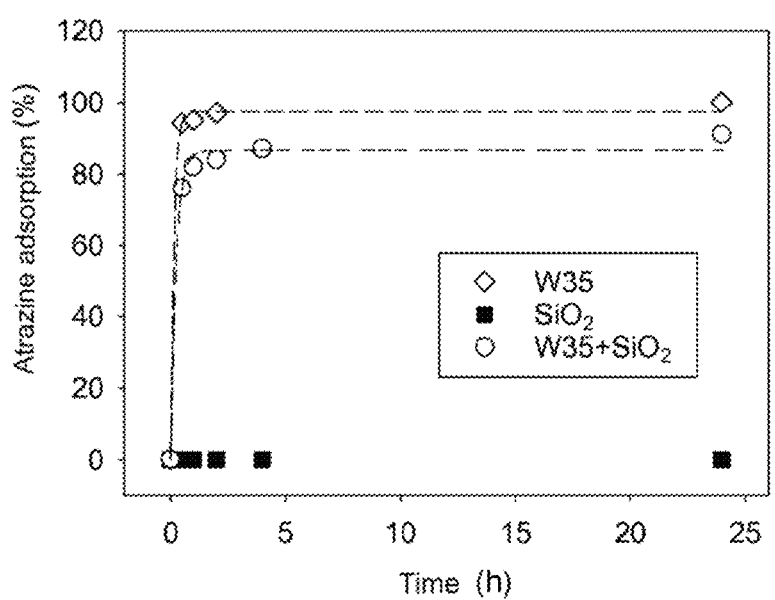
FIG. 15: Adsorption of atrazine by the W35 active carbon alone, the silica nanoparticles alone and the active carbon/silica nanoparticles mixture as a function of time.

Atrazine has a maximum absorbance at 223 nm. After said absorbance had been recorded for various contact times between the materials and the pollutants, it was converted into percentage adsorption relative to the stock solution of pollutant so as to give table 3:

As expected, the active carbon very rapidly and completely traps the atrazine. Conversely, the silica nanoparticles alone do not trap the atrazine at all. The mixture of the two gives a good overall adsorption but is certainly due to the active carbon alone (FIG. 15).

Figure 16:
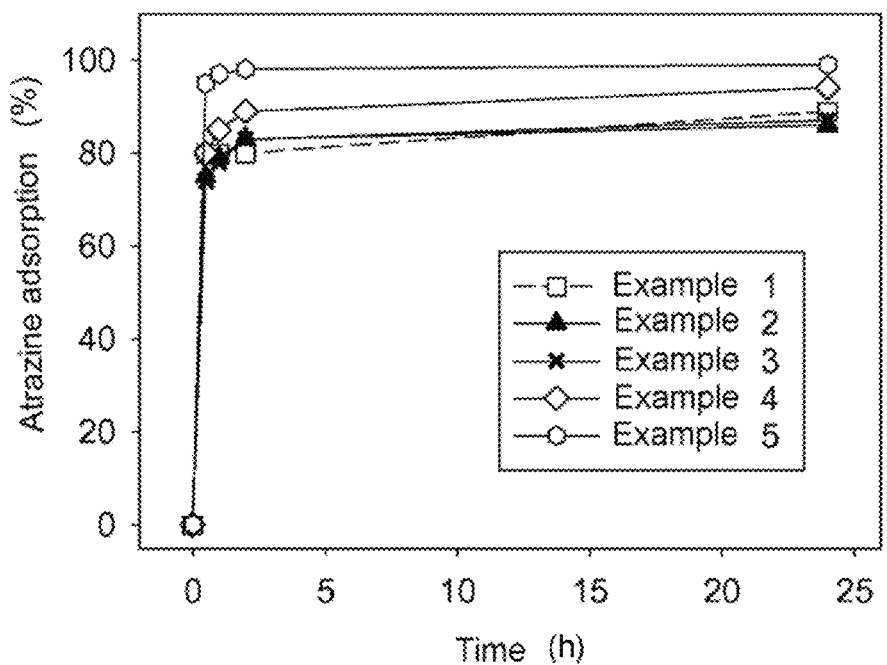
FIG. 16: Adsorption of atrazine by the materials of examples 1 to 5 as a function of time.
Figure 17:
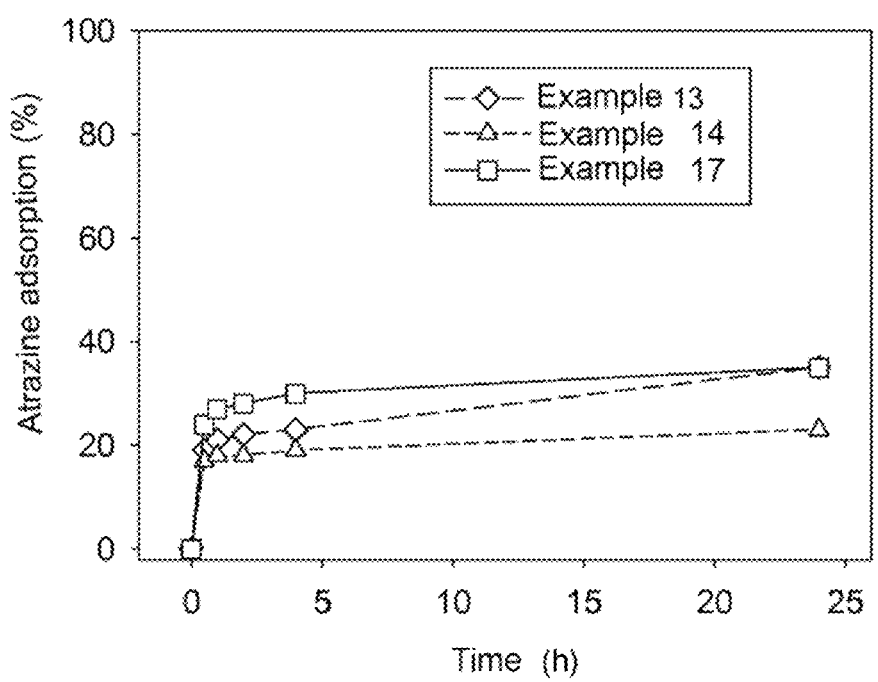
FIG. 17: Adsorption of atrazine by the materials of examples 13, 14 and 17 as a function of time.

The results of examples 1 to 5 (FIG. 16) and 13, 14 and 17 (FIG. 17) clearly show two tendencies. On the one hand, examples 1 to 5 prepared with a surfactant have an absorption comparable to the active carbon alone, even if though slightly less efficient with a rapid and almost complete adsorption. On the other hand, examples 13, 14 and 17 prepared without surfactant have a very low adsorption, certainly due to the lack of porosity of the silica allowing the atrazine to penetrate into the materials.

For this application example, the functionalization of the materials does not appear to have an impact, whether with the materials prepared with surfactant or with the materials prepared without surfactant.

Figure 18:
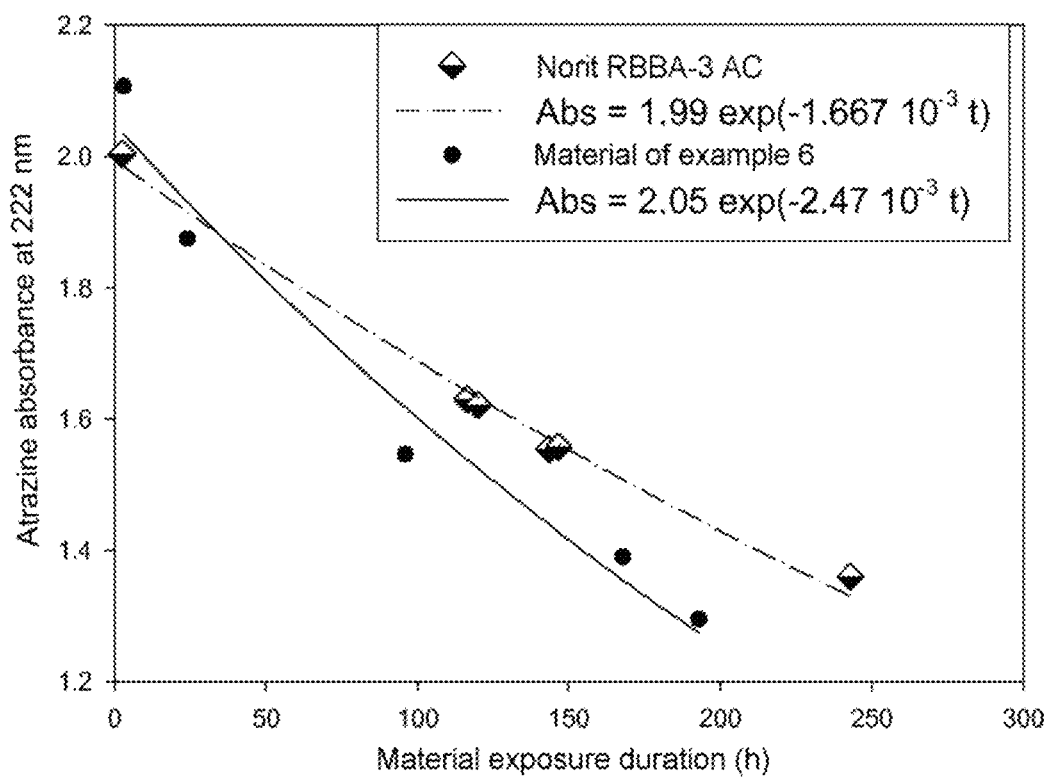
FIG. 18: Absorption at 222 nm of the residual atrazine in the impregnation solution nm as a function of the duration of Norrit RBBA AC impregnation. Comparison with the material of example 6.

Application Example 2: Adsorption of Atrazine by the Materials Corresponding to Examples 6 to 7A and 7B Adsorption tests were carried out with the materials corresponding to examples 6, 7A and 7B. Two granules were placed in the presence of solutions of atrazine at 10.65 mg·l$^{-1}$. The granules were introduced into a flask containing 100 ml of the atrazine solution and a magnetic bar and were magnetically stirred. The residual absorbance of the atrazine was measured at various intervals. FIG. 18 makes it possible to compare the rates of atrazine adsorption by the Norrit RBBA-3 active carbon alone or coated with a layer of material of example 6.

Table 4 groups together the values of the standardized atrazine adsorption rates relative to the mass of active carbon of each material. Even though the rods coated with sol-gel material appear to have a better efficiency for atrazine adsorption, the adsorption rates are very low compared with the materials obtained with surfactant.

TABLE 4

Atrazine adsorption rates

| Sample | Functionalization | Adsorption rate (h$^{-1}$) | Mass of AC (mg) | Standardized rate (h$^{-1}$g$^{-1}$) |
|---|---|---|---|---|
| Norrit RBBA-3 AC | | 3.32 10$^{-3}$ | 81.05 | 4.10 10$^{-2}$ |
| Example 6 | TMOS/APTES 0.97/0.03 sol maturation: 1 min | 5.06 10$^{-3}$ | 79.88 | 6.33 10$^{-2}$ |

TABLE 3

% adsorption of atrazine

| | Time (h) | W35 | SiO$_2$ | W35 + SiO$_2$ | Example 1 | Example 2 | Example 3 | Example 4 | Example 5 | Example 13 | Example 14 | Example 17 |
|---|---|---|---|---|---|---|---|---|---|---|---|---|
| % atrazine adsorption | 0 | 0 | 0 | 0 | 0 | 0 | 0 | 0 | 0 | 0 | 0 | 0 |
| | 0.5 | 94 | 0 | 76 | 80 | 75 | 74 | 80 | 95 | 19 | 17 | 24 |
| | 1 | 95 | 0 | 82 | 80 | 79 | 78 | 85 | 97 | 21 | 18 | 27 |
| | 2 | 97 | 0 | 84 | 80 | 83 | 83 | 89 | 98 | 22 | 18 | 28 |
| | 4 | #N/A | #N/A | 87 | #N/A | #N/A | #N/A | #N/A | 98 | 23 | 19 | 30 |
| | 24 | 100 | 0 | 91 | 89 | 86 | 87 | 94 | 99 | 35 | 23 | 35 |

TABLE 4-continued

Atrazine adsorption rates

| Sample | Functionalization | Adsorption rate (h$^{-1}$) | Mass of AC (mg) | Standardized rate (h$^{-1}$g$^{-1}$) |
|---|---|---|---|---|
| Example 7A | TMOS/APTES 0.9/0.06 sol maturation: 1 min | 4.37 10$^{-3}$ | 76.39 | 5.72 10$^{-2}$ |
| Example 7B | TMOS/APTES 0.94/0.06 sol maturation: 3 min | 3.45 10$^{-3}$ | 80.34 | 4.29 10$^{-2}$ |

Application Example 3: Adsorption of Acetone by the Materials

Acetone is part of the range of very small pollutants which in theory are not retained by active carbon. The adsorption capacity of the materials was determined on the basis of the suspension thereof in solutions of pollutants and the study of the supernatant over time. For this, 8 mg of materials are deposited in a plastic flask. 60 ml of an aqueous solution containing acetone at 10 mg/l are added and the solution is stirred at ambient temperature. Aliquots of 6 ml are taken over time and centrifuged to remove the traces of materials, and the supernatant solutions are studied by UV spectroscopy.

Below is the list of materials that were used:

| | |
|---|---|
| W35 | Active carbon |
| SiO$_2$ | Silica nanoparticles |
| W35 + SiO$_2$ | Mixture of active carbon and of silica nanoparticles |
| Example 1 | Nonfunctionalized hybrid |
| Example 2 | Hybrid functionalized with amine groups |
| Example 3 | Hybrid functionalized with acid groups |
| Example 4 | Hybrid functionalized with aromatic groups |
| Example 5 | Hybrid functionalized with urea groups |
| Example 13 | Hybrid functionalized with urea groups, prepared without surfactant |
| Example 14 | Hybrid functionalized with aromatic groups, prepared without surfactant |
| Example 17 | Hybrid functionalized with amine groups, prepared without surfactant |

Figure 19:
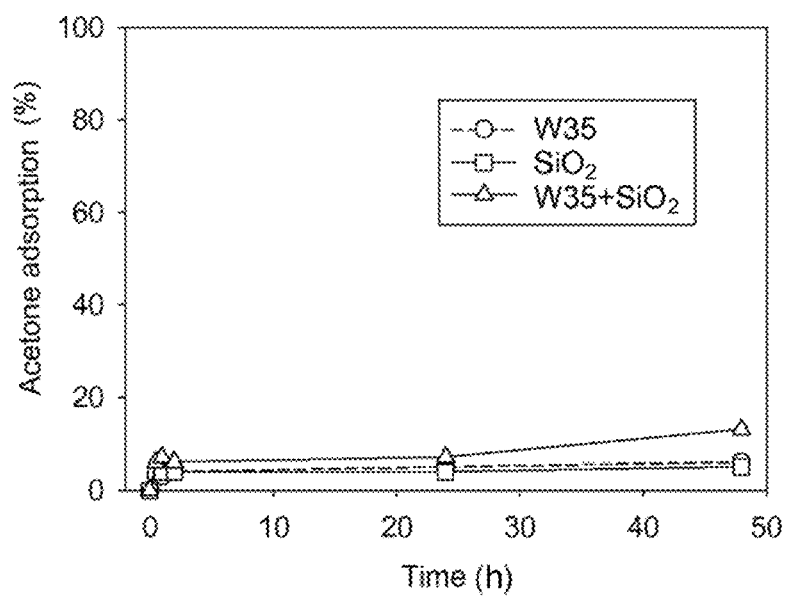
FIG. 19: Adsorption of acetone by the W35 active carbon alone, the silica nanoparticles alone and the active carbon/silica nanoparticles mixture as a function of time.

Acetone has a maximum absorbance at 265 nm. After said absorbance had been recorded for various contact times between the materials and the pollutants, it was converted into percentage adsorption relative to the stock solution of pollutant so as to give table 5:

As expected, the carbon alone, just like the silica nanoparticles alone, does not trap acetone (FIG. 19). After 48 h in suspension, the percentage adsorption is only 6% and 5% respectively. The physical mixture of the two gives the same result for 24 h with a slight improvement after 48 h.

Figure 21:
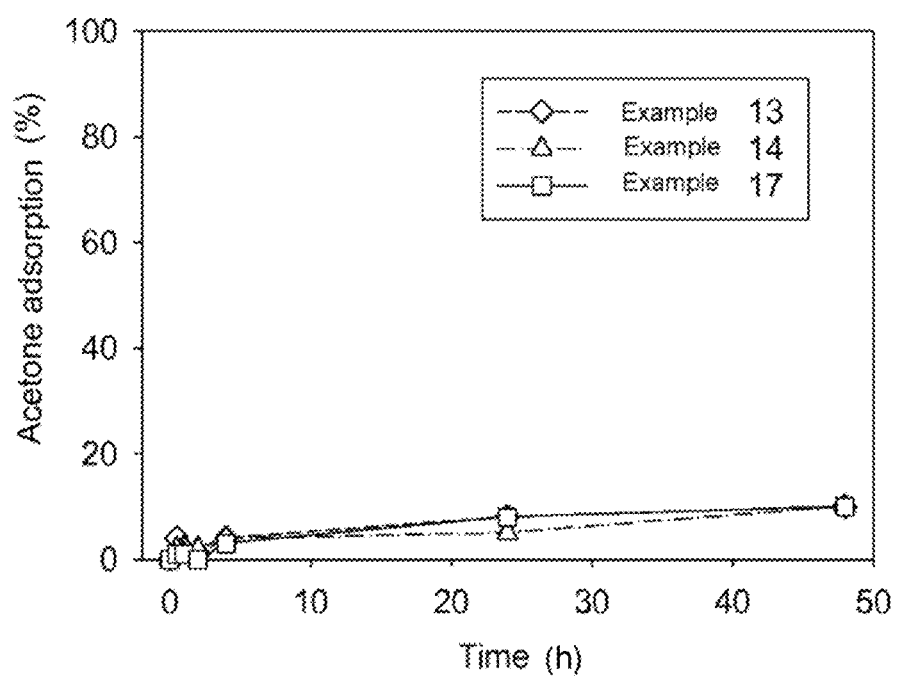
FIG. 21: Adsorption of acetone by the materials of examples 13, 14 and 17 as a function of time.

In the case of examples 13, 14 and 17 (FIG. 21), prepared without surfactant, it is noted that the acetone adsorption is not very efficient. This phenomenon is definitely linked to the fact that there was no porosity induced by the silica.

Figure 20:
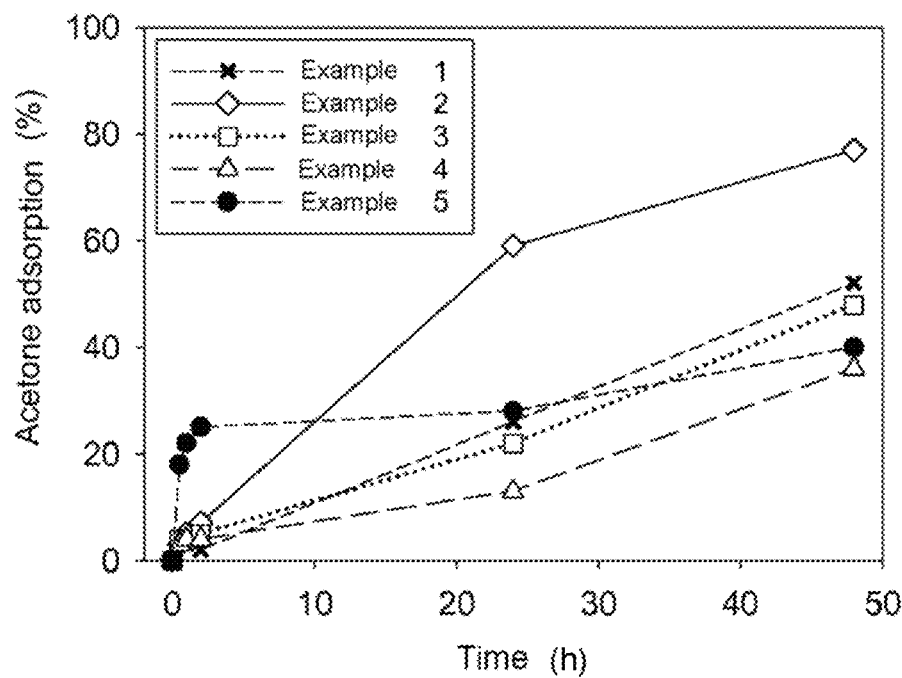
FIG. 20: Adsorption of acetone by the materials of examples 1 to 5 as a function of time.

For examples 1 to 5 (FIG. 20), prepared with a surfactant, several behaviors linked to the functionalization of the latter are noted. In the majority of the materials, an average adsorption of approximately 50% is observed. However, in the case of example 2, functionalized with amine groups, a strong adsorption of the materials up to 77% is noted. The possibility of forming hydrogen bonds between the amine functions of the material and the acetone will promote the adsorption of the latter by virtue of these weak interactions.

Application Example 4: Adsorption of Acetaldehyde by the Materials

Acetaldehyde is part of the range of very small pollutants which in theory are not retained by active carbon. The adsorption capacity of the materials was determined on the basis of the suspension thereof in solutions of pollutants and the study of the supernatant over time. For this, 8 mg of materials are deposited in a plastic flask. 60 ml of an aqueous solution containing acetaldehyde at 11 mg/l are added and the solution is stirred at ambient temperature. Aliquots of 6 ml are taken over time and centrifuged to remove the traces of materials, and the supernatant solutions are studied by UV spectroscopy.

Below is the list of materials that were used:

| | |
|---|---|
| W35 | Active carbon |
| SiO$_2$ | Silica nanoparticles |
| W35 + SiO$_2$ | Mixture of active carbon and of silica nanoparticles |
| Example 1 | Nonfunctionalized hybrid |
| Example 2 | Hybrid functionalized with amine groups |
| Example 3 | Hybrid functionalized with acid groups |
| Example 4 | Hybrid functionalized with aromatic groups |
| Example 5 | Hybrid functionalized with urea groups |
| Example 13 | Hybrid functionalized with urea groups, prepared without surfactant |
| Example 14 | Hybrid functionalized with aromatic groups, prepared without surfactant |
| Example 17 | Hybrid functionalized with amine groups, prepared without surfactant |

Acetaldehyde has a maximum absorbance at 278 nm. After said absorbance had been recorded for various contact times between the materials and the pollutants, it was

TABLE 5

Acetone adsorption percentages

| | Time (h) | W35 | SiO$_2$ | W35 + SiO$_2$ | Example 1 | Example 2 | Example 3 | Example 4 | Example 5 | Example 13 | Example 14 | Example 17 |
|---|---|---|---|---|---|---|---|---|---|---|---|---|
| % acetone adsorption | 0 | 0 | 0 | 0 | 0 | 0 | 0 | 0 | 0 | 0 | 0 | 0 |
| | 0.5 | 3 | 4 | 6 | 3 | 3 | 4 | 3 | 18 | 4 | 2 | 1 |
| | 1 | 3 | 4 | 7 | 3 | 5 | 4 | 4 | 22 | 2 | 1 | 1 |
| | 2 | 4 | 4 | 6 | 2 | 7 | 5 | 4 | 25 | 1 | 2 | 0 |
| | 4 | #N/A | #N/A | #N/A | #N/A | #N/A | #N/A | #N/A | 28 | 4 | 4 | 3 |
| | 24 | 5 | 4 | 7 | 26 | 59 | 22 | 13 | 40 | 8 | 5 | 8 |
| | 48 | 6 | 5 | 13 | 52 | 77 | 48 | 36 | 51 | 10 | 10 | 10 | converted into percentage adsorption relative to the stock solution of pollutant so as to give table 6:

TABLE 6

Acetaldehyde adsorption percentages

| | Time (h) | W35 | SiO$_2$ | W35 + SiO$_2$ | Example 1 | Example 2 | Example 3 | Example 4 | Example 5 | Example 13 | Example 14 | Example 17 |
|---|---|---|---|---|---|---|---|---|---|---|---|---|
| % Acetaldehyde adsorption | 0 | 0 | 0 | 0 | 0 | 0 | 0 | 0 | 0 | 0 | 0 | 0 |
| | 0.5 | 1 | 0 | 1 | 2 | 2 | 2 | 1 | 4 | 4 | 2 | 4 |
| | 1 | 1 | 0 | 0 | 4 | 0 | −1 | −4 | 4 | 3 | 3 | 3 |
| | 4 | 3 | 2 | 2 | 7 | −1 | −1 | −2 | 8 | 4 | 6 | 5 |
| | 24 | 4 | 4 | 10 | 10 | 10 | 14 | 9 | 22 | 10 | 13 | 6 |
| | 48 | 3 | 3 | #N/A | 15 | 30 | 25 | 23 | #N/A | #N/A | #N/A | #N/A |
| | 72 | 7 | 5 | 10 | 16 | 62 | 44 | 48 | 58 | 14 | 17 | 11 |

Figure 22:
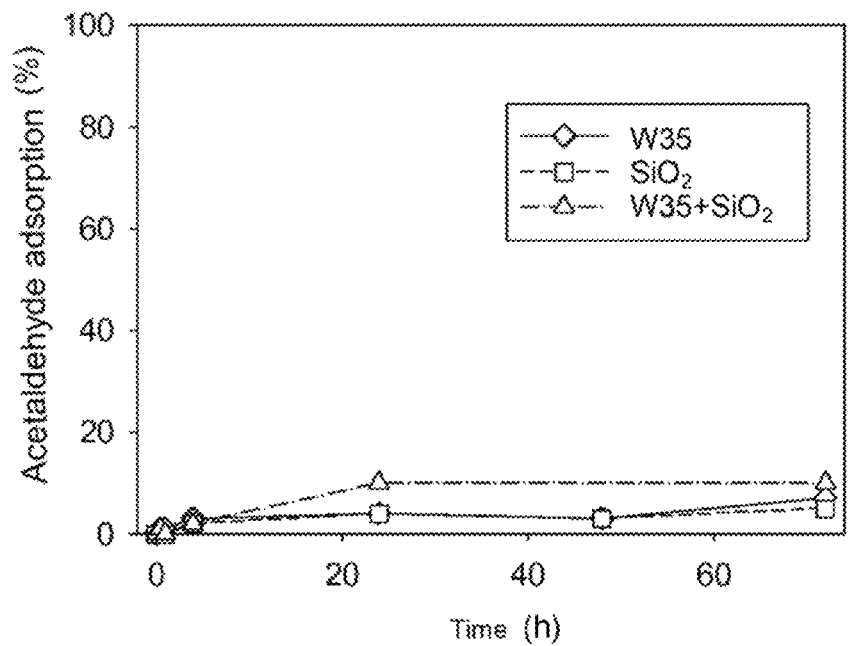
FIG. 22: Adsorption of acetaldehyde by the W35 active carbon alone, the silica nanoparticles alone and the active carbon/silica nanoparticles mixture as a function of time.

The adsorption percentage of the active carbon alone, of the silica nanoparticles alone and of the physical mixture of the two is very low as expected even after 72 h (FIG. 22).

Figure 23:
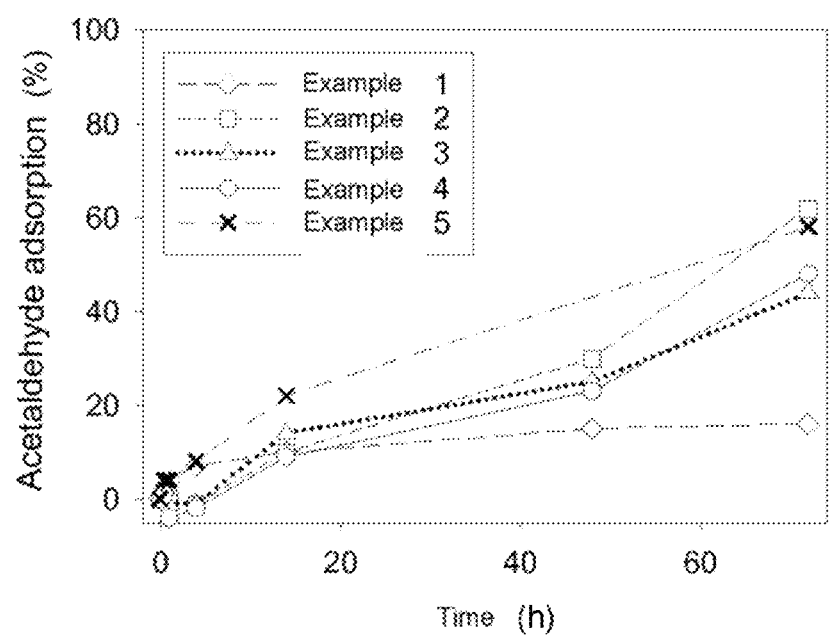
FIG. 23: Adsorption of acetaldehyde by the materials of examples 1 to 5 as a function of time.
Figure 24:
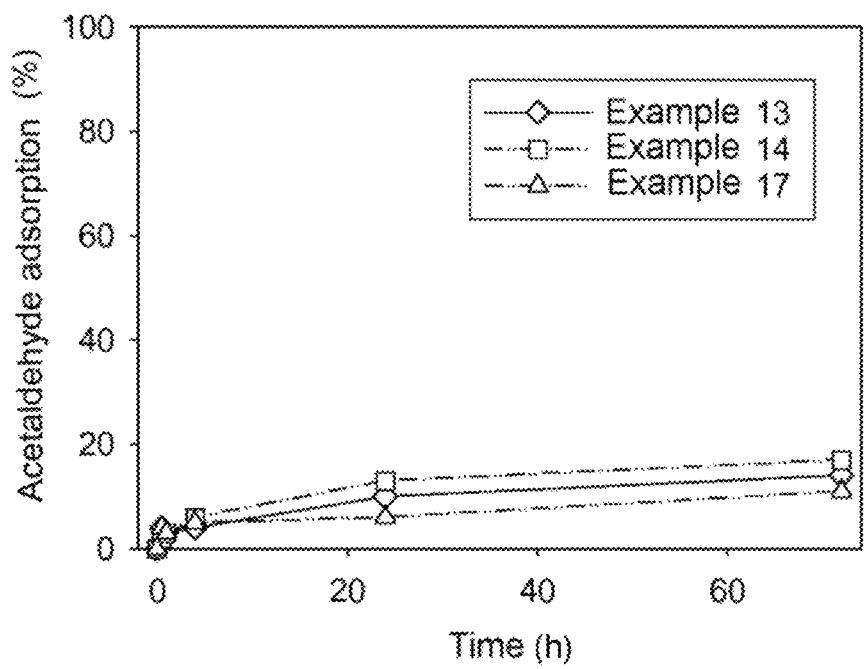
FIG. 24: Adsorption of acetaldehyde by the materials of examples 13, 14 and 17 as a function of time.

Once again, a very low adsorption of examples 13, 14 and 17 (FIG. 24), prepared without surfactant, is noted. On the other hand, for the first time, a low adsorption is also noted for example 1 (FIG. 23) prepared with CTAB but without additional functionalization. Indeed, after 72 h, example 1 shows only 16% acetaldehyde adsorption.

However, examples 2 to 5 (FIG. 23), having additional functional groups, demonstrate the usefulness of the latter through a very clear increase in adsorption between 44% and 62%, demonstrating the usefulness of a functionalization for improving more specific targeting of the pollutants.

Application Example 5: Adsorption of Methiocarb by the Materials

Methiocarb, like atrazine, is part of the average-sized molecules that can be easily adsorbed by active carbon. This example constitutes a second test for comparing our materials with active carbon under its optimal conditions. The adsorption capacity of the materials was determined on the basis of the suspension thereof in solutions of pollutants and the study of the supernatant over time. For this, 8 mg of materials are deposited in a plastic flask. 60 ml of an aqueous solution containing methiocarb at 10 mg/l are added and the solution is stirred at ambient temperature. Aliquots of 6 ml are taken over time and centrifuged to remove the traces of materials, and the supernatant solutions are studied by UV spectroscopy.

Below is the list of materials that were used:

| | |
|---|---|
| W35 | Active carbon |
| SiO$_2$ | Silica nanoparticles |
| W35 + SiO$_2$ | Mixture of active carbon and of silica nanoparticles |
| Example 1 | Nonfunctionalized hybrid |
| Example 2 | Hybrid functionalized with amine groups |
| Example 3 | Hybrid functionalized with acid groups |
| Example 4 | Hybrid functionalized with aromatic groups |
| Example 5 | Hybrid functionalized with urea groups |
| Example 13 | Hybrid functionalized with urea groups, prepared without surfactant |
| Example 14 | Hybrid functionalized with aromatic groups, prepared without surfactant |
| Example 17 | Hybrid functionalized with amine groups, prepared without surfactant |

Methiocarb has a maximum absorbance at 262 nm. After said absorbance had been recorded for various contact times between the materials and the pollutants, it was converted into percentage adsorption relative to the stock solution of pollutant so as to give table 7:

TABLE 7

Methiocarb adsorption percentages

| | Time (h) | W35 | SiO$_2$ | W35 + SiO$_2$ | Example 1 | Example 2 | Example 3 | Example 4 | Example 5 | Example 13 | Example 14 | Example 17 |
|---|---|---|---|---|---|---|---|---|---|---|---|---|
| % Methiocarb adsorption | 0 | 0 | 0 | 0 | 0 | 0 | 0 | 0 | 0 | 0 | 0 | 0 |
| | 3 | 100 | 6 | 40 | 99 | 86 | 93 | 84 | 88 | 3 | 13 | 5 |
| | 24 | 102 | 12 | 45 | 97 | 87 | 96 | 89 | 91 | 4 | 21 | 3 |

Figure 25:
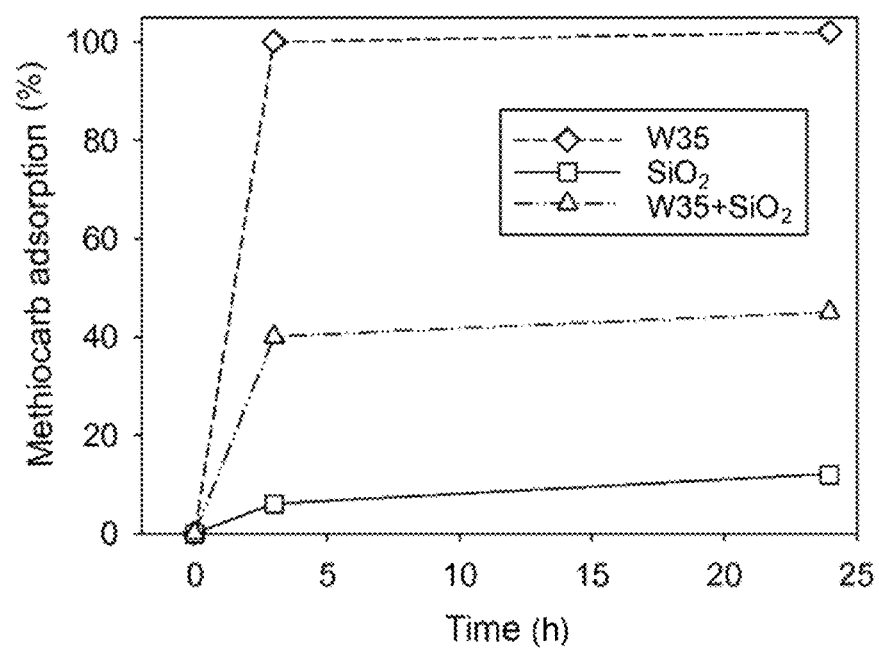
FIG. 25: Adsorption of methiocarb by the W35 active carbon alone, the silica nanoparticles alone and the active carbon/silica nanoparticles mixture as a function of time.
Figure 27:
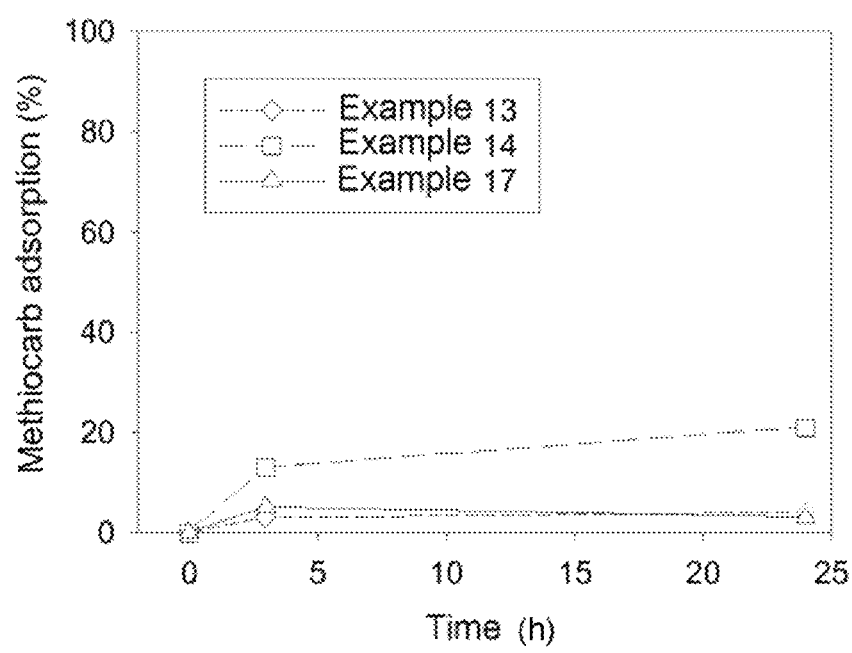
FIG. 27: Adsorption of methiocarb by the materials of examples 13, 14 and 17 as a function of time.

The methiocarb adsorption by the active carbon follows the expected behavior with complete adsorption after only 3 h. This behavior is found for example 1. In the case of SiO$_2$ (FIG. 25), it is noted that the adsorption is very low just like examples 13, 14 and 17 (FIG. 27), prepared without surfactant, linking the adsorption to the access to the porosity of active carbon.

Figure 26:
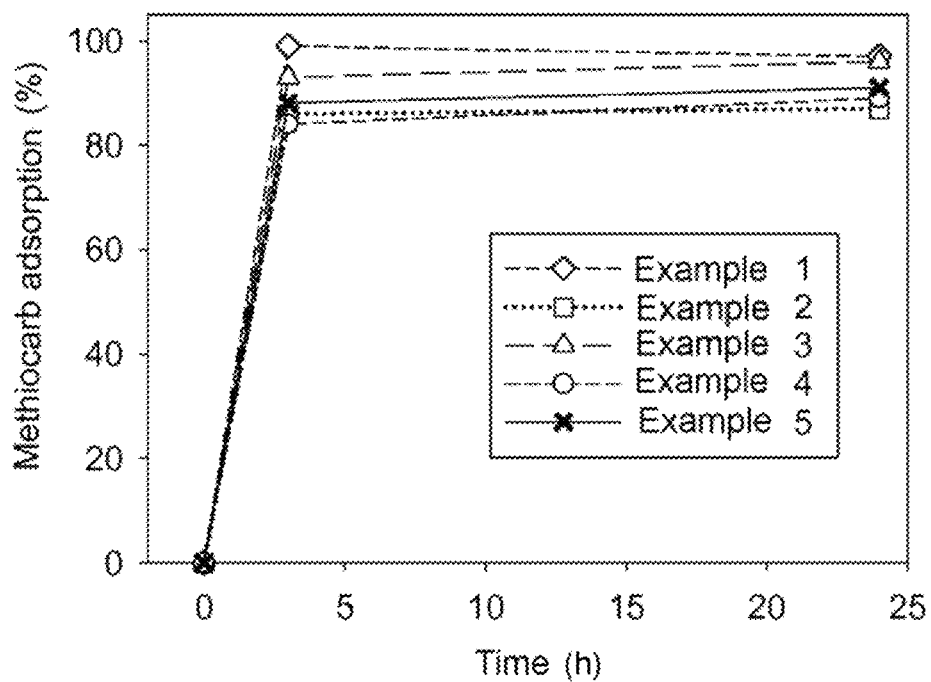
FIG. 26: Adsorption of methiocarb by the materials of examples 1 to 5 as a function of time.

Finally, as with atrazine, examples 2 to 5 (FIG. 26) showed a behavior very close to active carbon with a virtually complete absorption after 3 h.

Application Example 6: Filtering System

Figure 31:
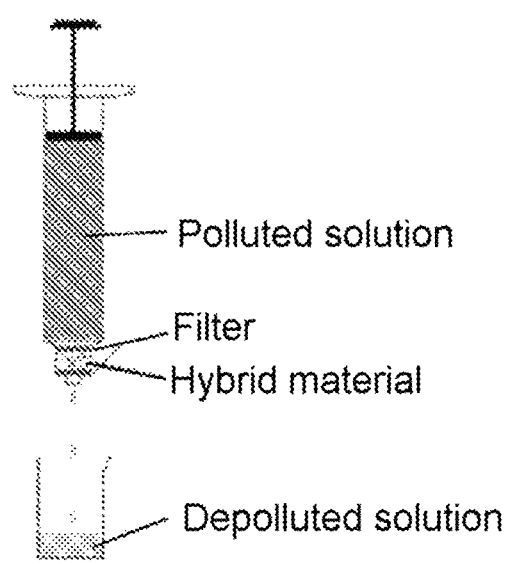
FIG. 31: Schematic representation of the syringe filtration system.

A model filtering system was installed. This system consists of a syringe in which the hybrid material is trapped between two cottonwool filters and through which the solution containing the pollutant must pass (FIG. 31).

5 mg of example 1 were inserted between the two filters and 10 ml of atrazine solution at 20 mg/l were made to flow through. The liquid harvested was then passed directly to UV-visible spectroscopy (Varian 300 spectrometer). This operation was repeated a second time to verify that the filter still adsorbed. The data obtained by spectroscopy are presented in FIG. 28.

Figure 28:
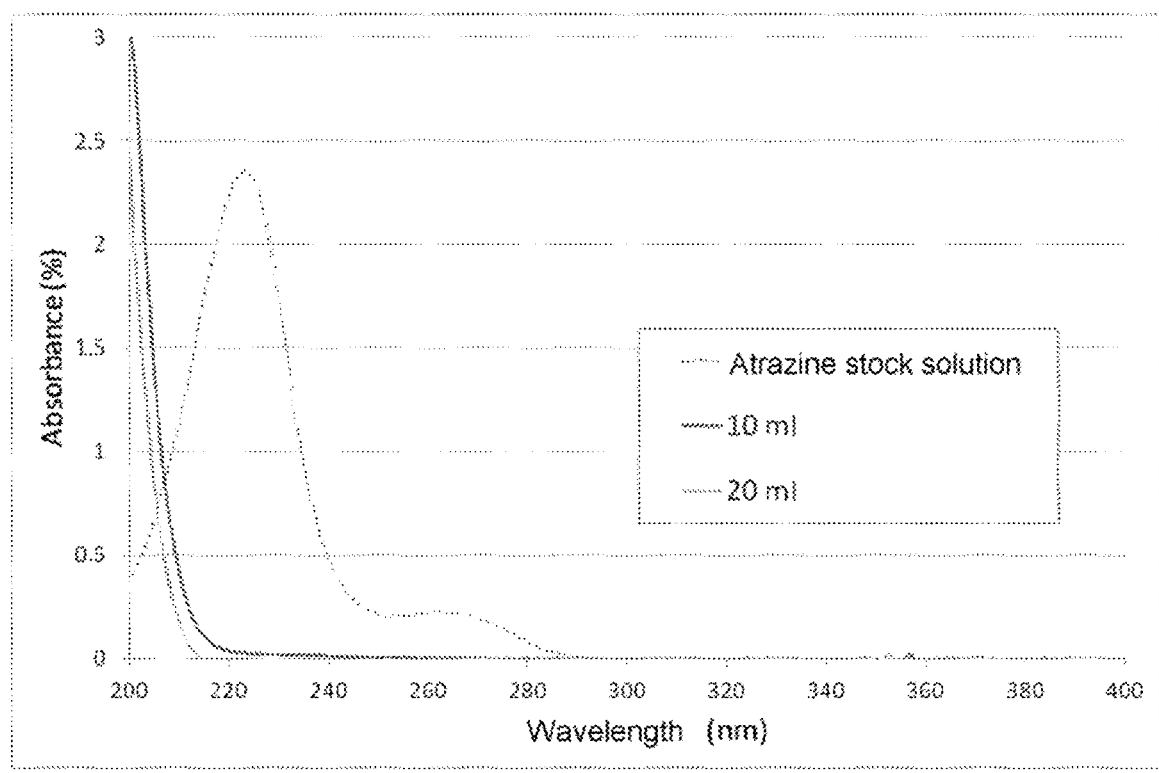
FIG. 28: Adsorption of atrazine by the hybrid material of example 1 after passage through the filtering system.

It is observed that, for the first 10 milliliters as much as for the next 10, the atrazine is completely adsorbed by example 1 (FIG. 28). Moreover, a parallel study was carried out without materials in order to see the absorption capacity of the filters alone. This study showed that the filters used do not absorb atrazine and do not therefore influence our results.

Application Example 8: Filtering System for Methiocarb Adsorption

Figure 29:
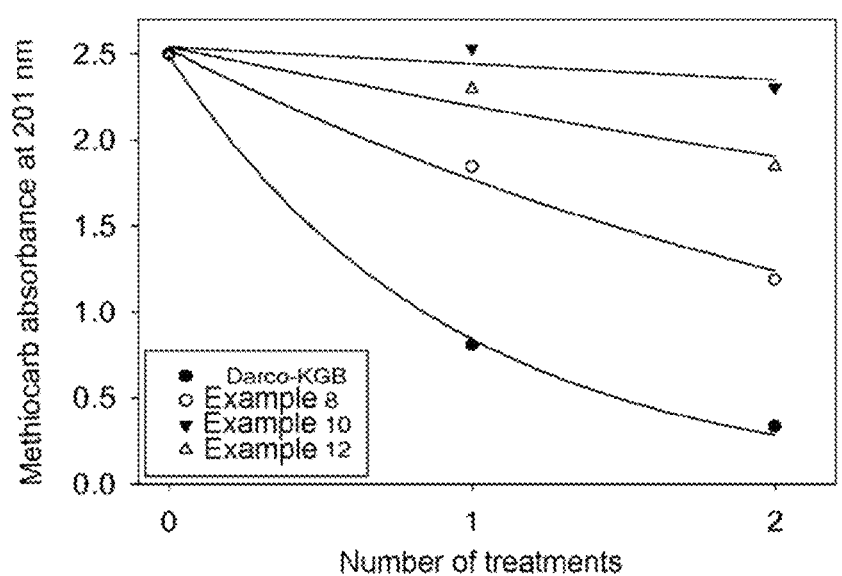
FIG. 29: Adsorption of methiocarb by the Darco-KGB active carbon and the materials of examples 8, 10 and 12 as a function of time.
Figure 30:
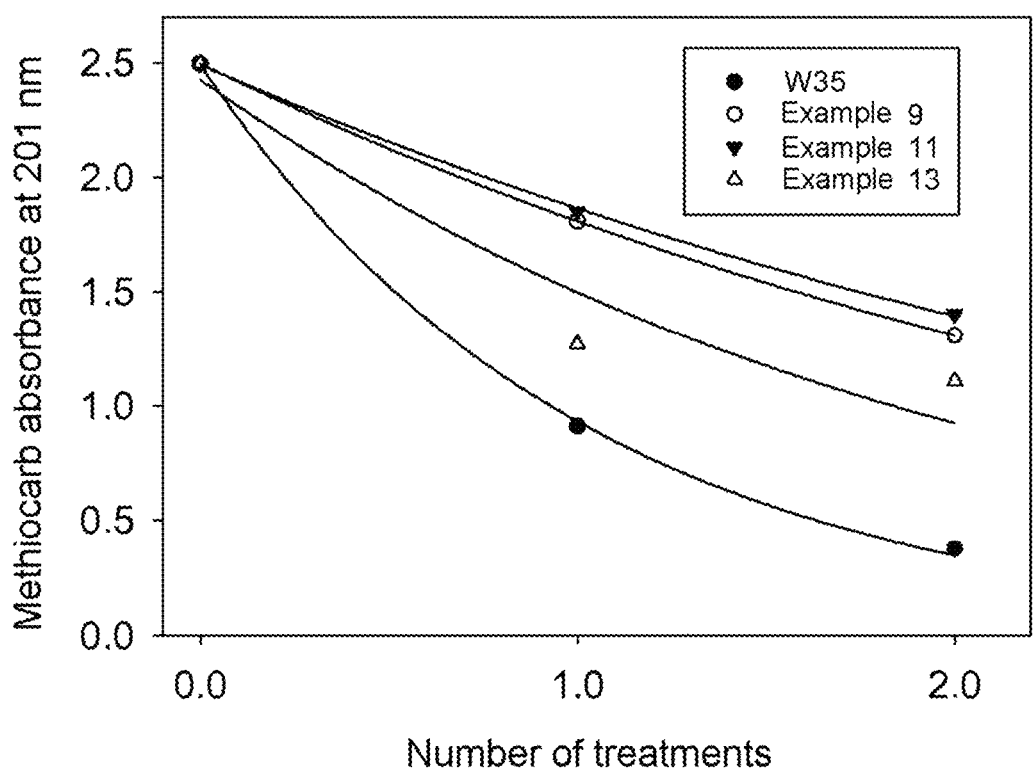
FIG. 30: Adsorption of methiocarb by the W35 active carbon and the materials of examples 9, 11 and 13 as a function of time.

The materials of examples 8 to 13 are tested in dynamic mode. The results are shown in FIGS. 29 and 30.

It is observed that, even though a dynamic treatment contributes to accelerating the adsorption of methiocarb, these hybrid materials are however less effective than the corresponding active carbon.

Application Example 9: Air Depollution Tests

Figure 32:
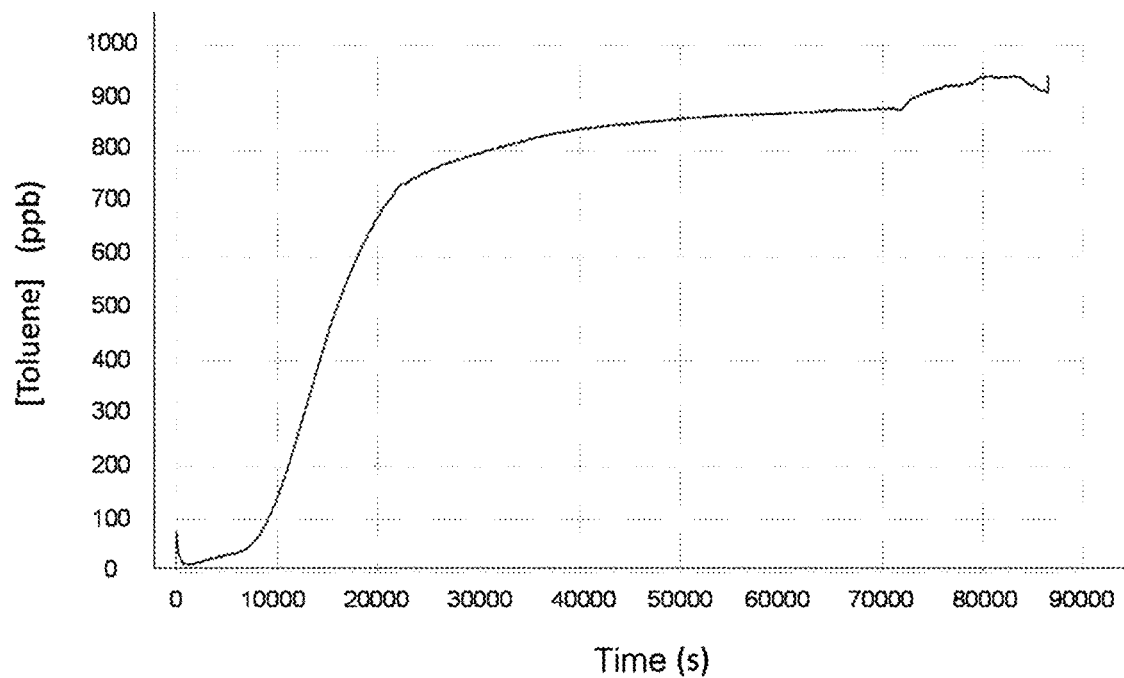
FIG. 32: Example of application for an air filter. Adsorption of toluene by the silica nanoparticles alone as a function of time.

An example of the use of example 4 is shown for toluene retention. A breakthrough curve for the material was established (FIG. 32). For this purpose, a 10 ml syringe, equipped with two end-pieces, is filled with 100 mg of example 4, and is then exposed to a stream of 350 ml/min of a gas mixture ($N_2$+toluene) containing 1 ppm (3.77 mg/m$^3$) of toluene. The toluene content upstream of the syringe is measured and the content downstream is monitored over time. The measurement of the toluene content is carried out with a ppbRAE PID detector.

The breakthrough curve, shown below, indicates that the nanoparticles alone retain the toluene only very slightly. Indeed, traces of the latter are observed as early as the first minutes of the experiment and the concentration of toluene bases is found at the syringe outlet after 19 h.

Figure 33:
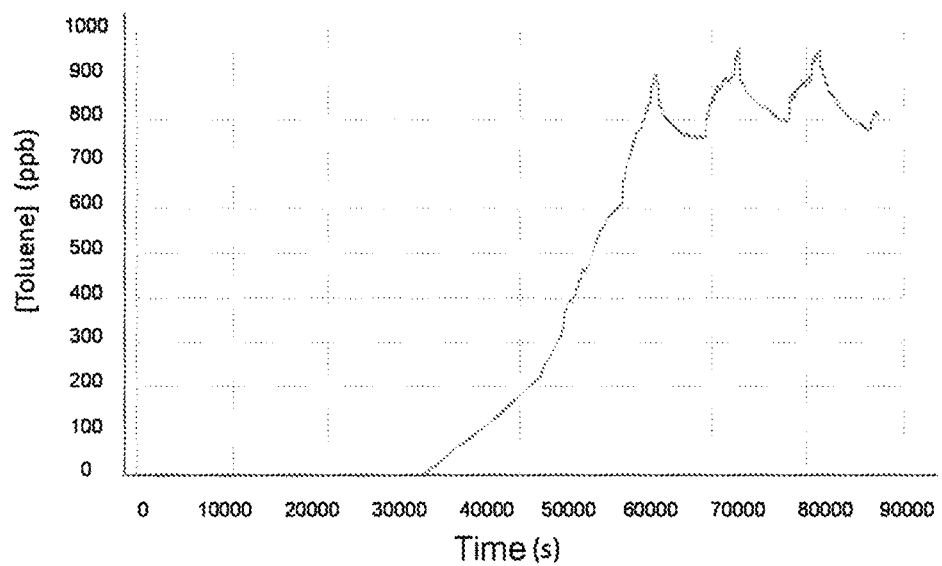
FIG. 33: Example of application for an air filter. Adsorption of toluene by the W35 active carbon as a function of time.
Figure 34:
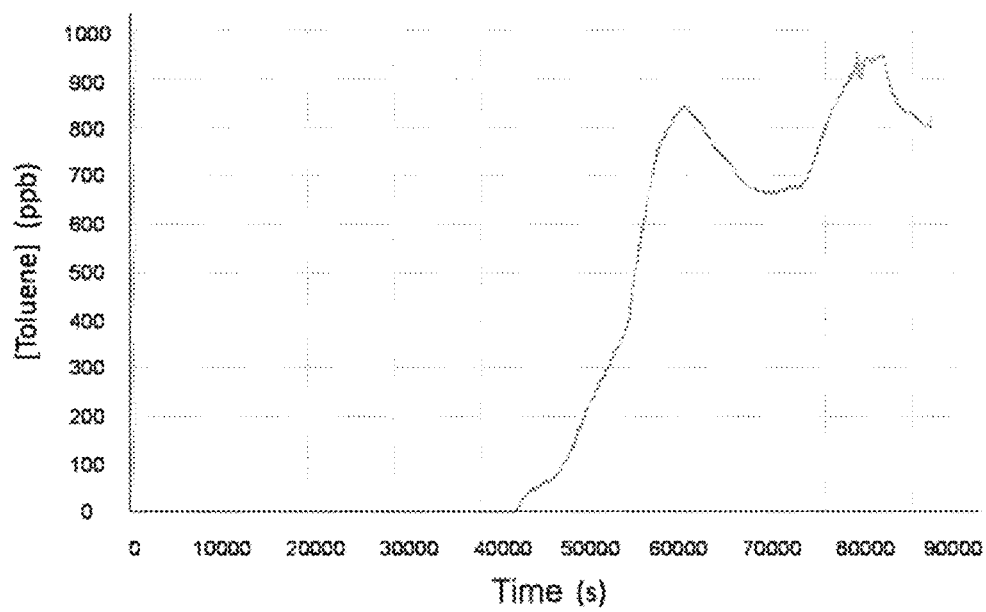
FIG. 34: Example of application for an air filter. Adsorption of toluene by example 4 as a function of time.

In the case of the active carbon alone (FIG. 33), the latter completely adsorbs the toluene for 83 h before gradually allowing it to pass through. It is only after 151 h that the same concentration of toluene is observed at the outlet and at the inlet of the syringe.

Finally, in the case of example 4 (FIG. 35), it is noted on the breakthrough curve that the appearance of toluene at the syringe outlet occurs only after 123 h and that the initial toluene concentration is found again only after 178 h. This result demonstrates that our materials have a much greater adsorbent capacity than the active carbon alone and are of use in possible applications as an air filter.

Figure 35:
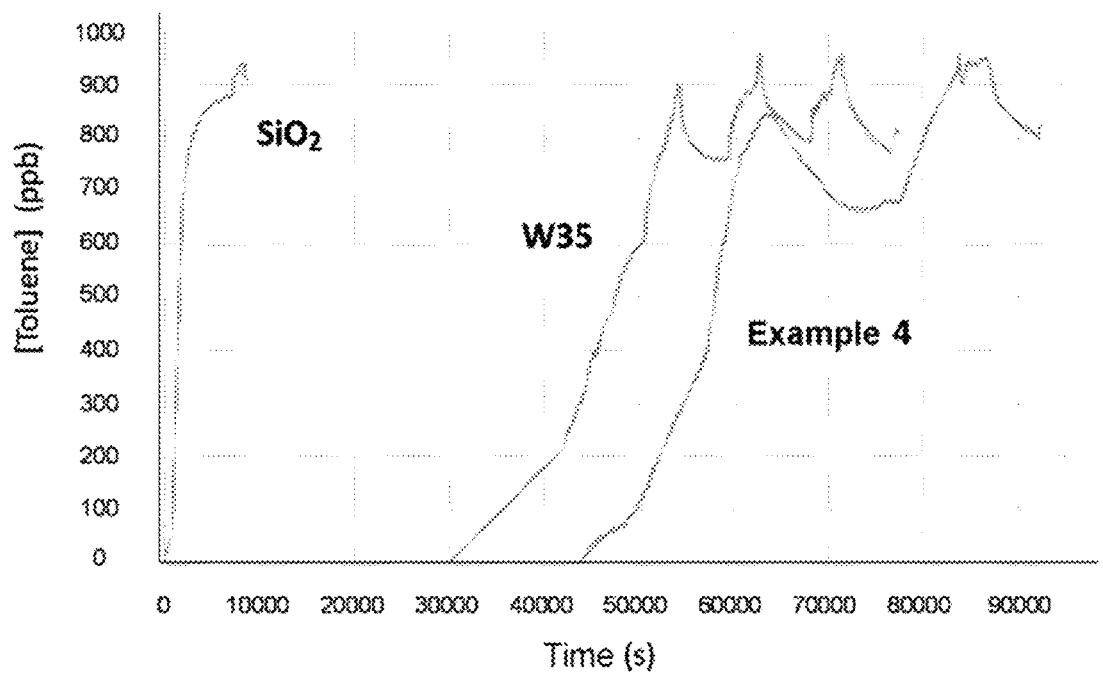
FIG. 35: Example of application for an air filter. Superposition of the graphs of the W35 active carbon alone, of the silica nanoparticles alone and of example 4, as a function of time.

FIG. 35 makes it possible to compare the toluene-trapping efficiencies of the various materials.

Application Example 10: Adsorption of Hexaldehyde by the Materials in Powder Form A comparison of the efficiency of the hybrid composite materials with those of the Norit W35 powdered active carbon and of the functionalized silicate matrices (SiO$_2$—NH$_2$, example 18, hybrid material and sol-gel silica alone) is carried out with a single pollutant, hexaldehyde. This compound is both present in interior air (emission from pine furniture) and abundantly emitted during the decomposition of superheated oil from fried foods. The adsorption capacity of the materials exposed to a calibrated stream of hexaldehyde was determined with the establishment of breakthrough curves.

Figure 37:
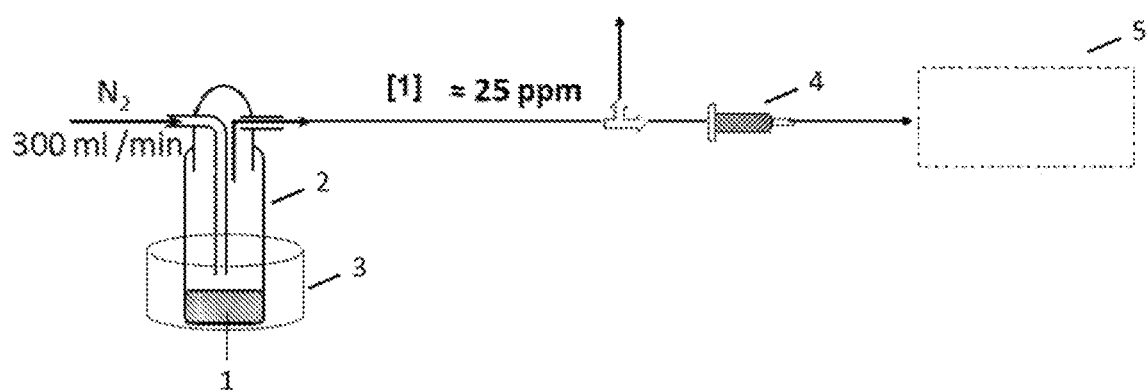
FIG. 37: Schematic representation of the device used for the establishment of breakthrough curves.

The device used for the establishment of a breakthrough curve is shown in FIG. 37. The generation of a calibrated gas mixture is obtained by sweeping the vapor phase of pure hexanal 1 contained in a wash bottle 1 maintained at −40° C. by means of an ethanol bath 2. At this temperature, the gas mixture contains 25 ppm of hexaldehyde (102 mg/m$^3$). A filter 3 consisting of a 6 ml syringe equipped with two end-pieces, filled with 50 mg of material to be tested, is exposed to the gas mixture stream. Since the Norit W35 active carbon is in the form of a micrometric powder, the functionalized silicate matrices and the hybrid materials were also milled to a micrometric powder. The hexaldehyde content upstream of the syringe is measured and the content downstream is monitored over time. The measurement of the hexaldehyde content is carried out with a ppbRAE PID detector 4.

Figure 38:
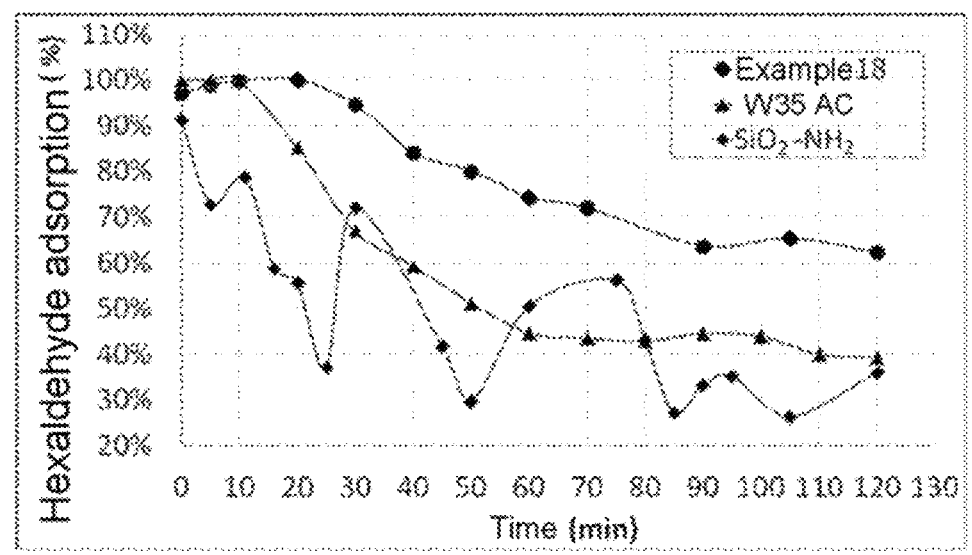
FIG. 38: Comparison of the adsorption capacities of the various powdered filters (50 mg, material of example 18, W35 active carbon and $SiO_2NH_2$ sol-gel silica corresponding to the sol-gel silica of the material of example 18), exposed to a gas stream of 300 ml/min containing 25 ppm of hexaldehyde.

The ratio $$\frac{[\text{Hexaldehyde}]_{upstream} - [\text{Hexaldehyde}]_{downstream}}{[\text{Hexaldehyde}]_{upstream}} \times 100$$

makes it possible to deduce the amount trapped by the material (FIG. 38).

The silica material functionalized with amine groups (SiO$_2$—NH$_2$) shows a low efficiency quite similar to that of active carbon over long periods of time (FIG. 38). The hybrid material functionalized with amine groups (example 18), which combines the adsorption capacity of active carbon and the irreversible adsorption capacity of the functionalized silica, is the most effective.

Figure 39:
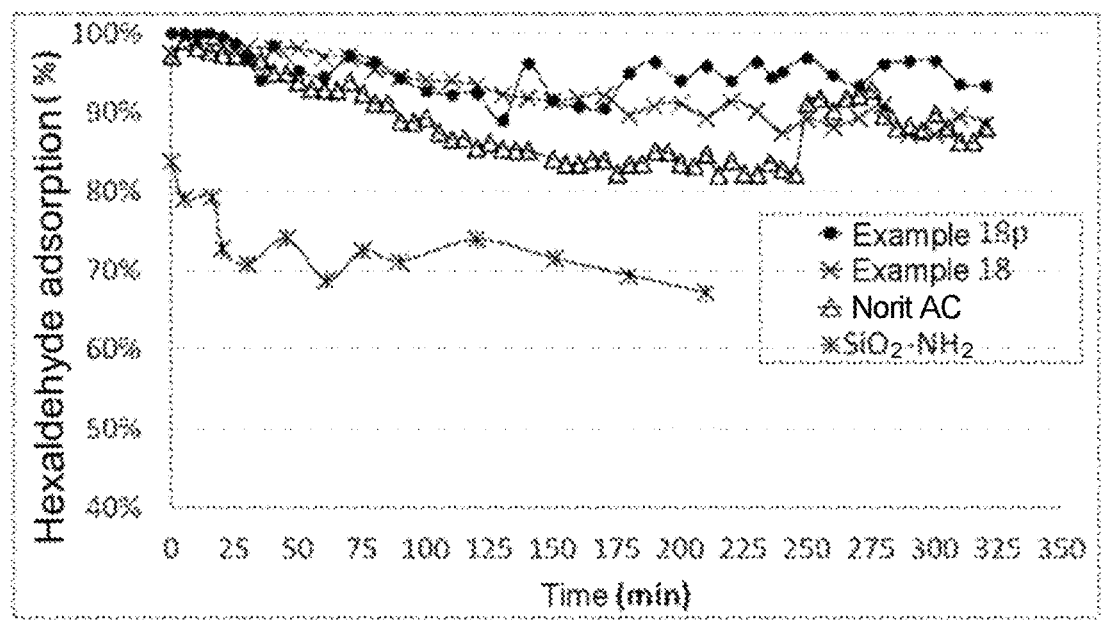
FIG. 39: Comparison of the adsorption capacities of various rod-shaped filters (1 g, material of example 18 and 18p, $SiO_2NH_2$ sol-gel silica corresponding to the sol-gel silica of the material of example 18), exposed to a gas stream of 300 ml/min containing 25 ppm of hexaldehyde.

Application Example 11: Hexaldehyde Adsorption by the Cylinder-Shaped Materials The effect of the shape of the materials on the hexaldehyde-trapping capacity is studied. The materials are in the form of cylindrical rods. The adsorption capacity of the materials was determined for hexaldehyde with the device of FIG. 37. For this purpose, a 6 ml syringe, equipped with two end-pieces, is filled with 1 g of material and then exposed to a stream of 300 ml/min of a gas mixture (N$_2$+hexaldehyde) containing 25 ppm (102 mg/m$^3$) of hexaldehyde. The hexaldehyde content upstream of the syringe is measured and the content downstream is monitored over time. The measurement of the hexaldehyde content is carried out with a ppbRAE PID detector. The ratio $$\frac{[\text{Hexaldehyde}]_{upstream} - [\text{Hexaldehyde}]_{downstream}}{[\text{Hexaldehyde}]_{upstream}} \times 100$$

makes it possible to deduce the amount trapped by the material (FIG. 39).

The materials tested are listed in table 8.

TABLE 8

| Rod-shaped materials exposed to hexaldehyde | |
|---|---|
| NORIT RBAA-3 | Active carbon in the shape of rods with dimensions of 0.6(L) × 0.3(diameter) cm, 1 g |
| SiO$_2$—NH$_2$ | Silica material functionalized with amine groups, with dimensions of 0.6(L) × 0.4(diameter) cm, 1 g |
| Example 18p | Hybrid material functionalized with amine groups, with dimensions of 0.95(L) × 0.25(diameter) cm, 1 g |
| Example 18 | Hybrid material functionalized with amine groups, with dimensions of 0.95(L) × 0.5(diameter) cm, 1 g |

The silica material alone functionalized with amine groups exhibits a much less effective adsorption than the active carbon alone and the hybrid materials (FIG. 39). Examples 18 and 18p exhibit a hexaldehyde adsorption that is more efficient than the Norit RBAA-3 active carbon, even though the active carbon granules are smaller From this study, it emerges that the size of the materials influences the trapping of pollutant. The smaller the rods, the more dense the filter will be, with an increase in the twistiness of the path of the gas stream, which promotes trapping of the pollutant.

Figure 40:
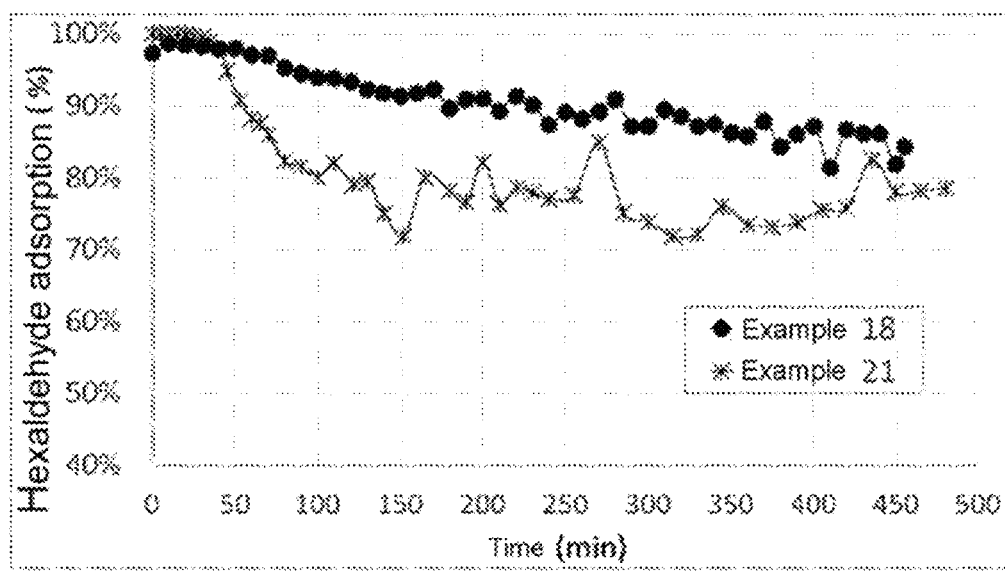
FIG. 40: Comparison of the efficiency of hexaldehyde adsorption by two materials bearing amine functions and differing from one another by the proportion of active carbon.

Application Example 12: Hexaldehyde Adsorption by the Functionalized Hybrid Materials Differing from One Another by the Proportion of Active Carbon The effect of a decrease in the proportion of active carbon was studied for the filter comprising 5% of APTES. The adsorption capacity of the materials was determined on the basis of their exposure to a calibrated stream of hexaldehyde. For this purpose, a 6 ml syringe, equipped with two end-pieces, is filled with 1 g of rod-shaped material, and is then exposed to a stream of 300 ml/min of a gas mixture ($N_2$+hexaldehyde) containing 25 ppm (102 mg/m$^3$) of hexaldehyde. The hexaldehyde content upstream of the syringe is measured and the content downstream is monitored over time. The measurement of the hexaldehyde content is carried out with a ppbRAE PID detector. The ratio $$\frac{[\text{Hexaldehyde}]_{upstream} - [\text{Hexaldehyde}]_{downstream}}{[\text{Hexaldehyde}]_{upstream}} \times 100$$

makes it possible to deduce the amount trapped by the material (FIG. 40).

The materials tested are listed in table 9.

TABLE 9

Hybrid materials functionalized with amine groups with various proportions of active carbon

| | |
|---|---|
| Example 18 | 5% APTES – [W35] = 222.6 mg/ml, cylindrical granules, 1 g |
| Example 21 | 5% APTES – [W35] = 148.4 mg/ml, cylindrical granules, 1 g |

The increase in the proportion of active carbon from 148.4 to 222.6 g/l improves the performance quality of the filter. The optimal amount of W35 AC in the sol is 222.6 g/l (FIG. 40).

Application Example 13: Hexaldehyde Adsorption by the Hybrid Materials Functionalized with Primary Amine Groups which Differ from One Another by the Proportion of Primary Amine (APTES)

Figure 41:
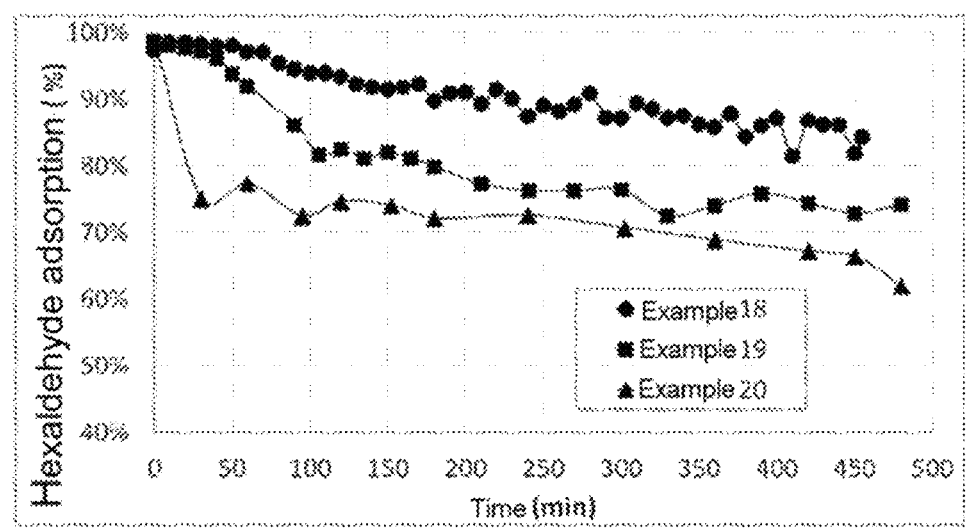
FIG. 41: Comparison of the efficiency of hexaldehyde adsorption by hybrid materials functionalized with amine groups with various proportions of APTES.

The effect of the proportion of precursors of silicon functionalized with primary amine groups (APTES) was studied. The adsorption capacity of the materials was determined on the basis of their exposure to a calibrated stream of hexaldehyde. For this purpose, a 6 ml syringe, equipped with two end-pieces, is filled with 1 g of material, and is then exposed to a stream of 300 ml/min of a gas mixture ($N_2$+hexaldehyde) containing 25 ppm (102 mg/m$^3$) of hexaldehyde. The hexaldehyde content upstream of the syringe is measured and the content downstream is monitored over time. The measurement of the hexaldehyde content is carried out with a ppbRAE PID detector. The ratio $$\frac{[\text{Hexaldehyde}]_{upstream} - [\text{Hexaldehyde}]_{downstream}}{[\text{Hexaldehyde}]_{upstream}} \times 100$$

makes it possible to deduce the amount trapped by the material (FIG. 41).

The materials tested are listed in table 10.

TABLE 10

Hybrid materials functionalized with amine groups with various proportions of APTES

| | |
|---|---|
| Example 18 | 5% APTES – [W35] = 222.6 mg/ml, 1 g cylindrical granules |
| Example 19 | 10% APTES – [W35] = 222.6 mg/ml, 1 g cylindrical granules |
| Example 20 | 15% APTES – [W35] = 222.6 mg/ml, 1 g cylindrical granules |

For this application example, it is noted that the percentage of silica precursor functionalized with amine groups (APTES) has an impact on the adsorption capacity. The results indicate that the more the proportion of amine groups increases, the more the hexanal-trapping capacity decreases. This phenomenon is probably due to the increase in the intrinsic basicity of the material, which disadvantages the reaction between the amines and the hexanal. Indeed, the reaction between amines and aldehydes is promoted in an acid medium. The optimized percentage of silica precursor functionalized with amine groups (APTES) is 5% for the trapping of an aldehyde.

Application Example 14: Hexaldehyde Adsorption by the Hybrid Materials Functionalized with Primary Amine Groups (APTES) and with Primary/Secondary Amine Groups (TMPED)

Figure 42:
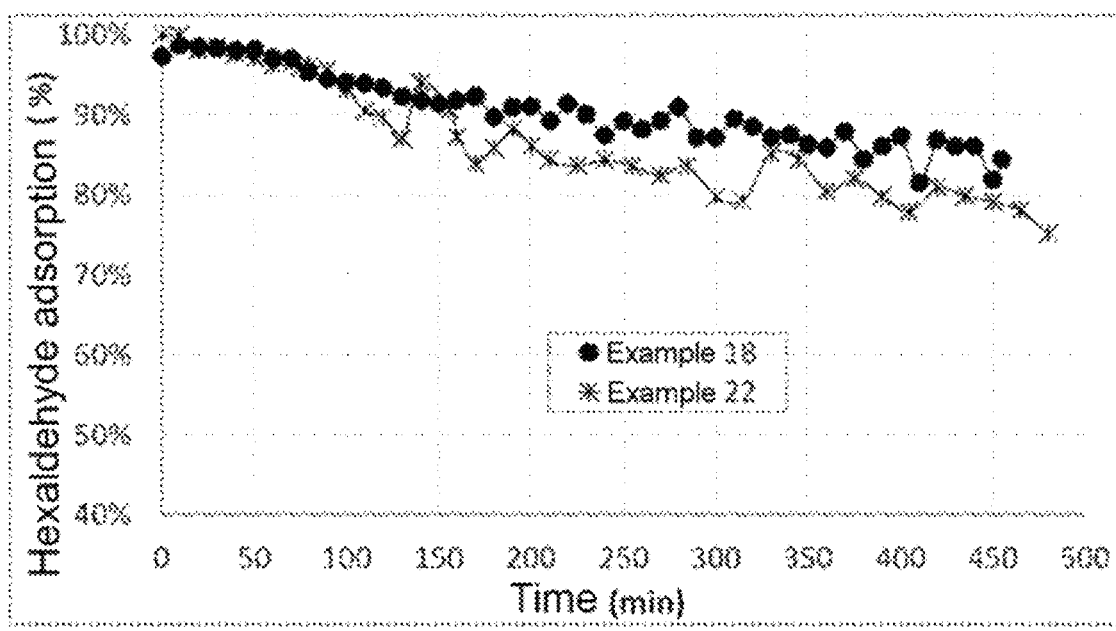
FIG. 42: Comparison of the efficiency of hexaldehyde adsorption by hybrid materials functionalized with primary amine groups (APTES) and by primary/secondary amine groups ($NH_2$-TMOS).

The effect of the nature of the amino silicon precursor was studied for the filter comprising 5% of APTES and 5% of TMPED. The adsorption capacity of the materials was determined on the basis of their exposure to a calibrated stream of hexaldehyde. For this purpose, a 6 ml syringe, equipped with two end-pieces, is filled with 1 g of material, and is then exposed to a stream of 300 ml/min of a gas mixture ($N_2$+hexaldehyde) containing 25 ppm (102 mg/m$^3$) of hexaldehyde. The hexaldehyde content upstream of the syringe is measured and the content downstream is monitored over time. The measurement of the hexaldehyde content is carried out with a ppbRAE PID detector. The ratio $$\frac{[\text{Hexaldehyde}]_{upstream} - [\text{Hexaldehyde}]_{downstream}}{[\text{Hexaldehyde}]_{upstream}} \times 100$$

makes it possible to deduce the amount trapped by the material (FIG. 42).

The materials tested are listed in table 11.

TABLE 11

Hybrid materials functionalized with primary amine groups (APTES) and with primary/secondary amine groups (NH$_2$—TMOS)

| | |
|---|---|
| Example 18 | 5% APTES – [W35] = 222.6 mg/ml, 1 g of cylindrical granules |
| Example 22 | 5% NH$_2$—TMOS – [W35] = 222.6 mg/ml, 1 g of cylindrical granules |

As expected, example 18 exhibits a more efficient adsorption capacity than example 22 since the intrinsic basicity of the matrix of example 18 is less (FIG. 42).

Application Example 15: Adsorption of Acetaldehyde, of Acetone and of E-2-Heptenal by the Hybrid Material Functionalized with Amine Groups (Example 18p)

Figure 43:
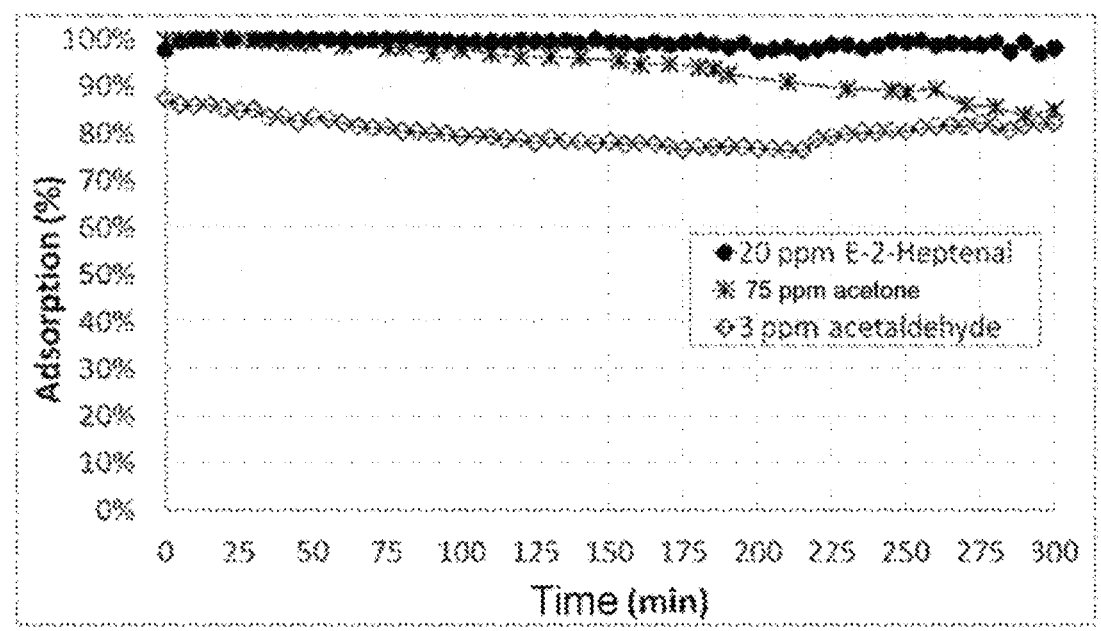
FIG. 43: Efficiency of trapping of various pollutants with example 18p.

An example of use of example 18p is shown for the retention of acetaldehyde, of acetone and of E-2-heptenal. The adsorption capacity of the materials was determined on the basis of their exposure to a calibrated stream of a pollutant. For this, a 6 ml syringe, equipped with two end-pieces, is filled with 1 g of granules of example 18p, and is then exposed to a stream of 300 ml/min of a gas mixture ($N_2$+pollutant) containing either 20 ppm of E-2-heptenal, or 75 ppm of acetone or 3 ppm of acetaldehyde. The pollutant content upstream of the syringe is measured and the content downstream is monitored over time. The measurement of the pollutant content is carried out with a ppbRAE PID detector. The ratio $$\frac{[\text{pollutant}]_{upstream} - [\text{pollutant}]_{downstream}}{[\text{pollutant}]_{upstream}} \times 100$$

makes it possible to deduce the amount trapped by the material (FIG. 43).

The material of example 18p traps heptenal very well, but acetone and acetaldehyde, which are small, a little less well. The acetone and acetaldehyde trapping rates still nevertheless remain high after 5 h of exposure (>80%).

Application Example 16: Test for Trapping of Total VOCs Resulting from the Oxidation of Oil, by Various Filters (Frying Odors)

Hundreds of volatile compounds are generated by the oxidation of the oil used as a heat vector for cooking foods. The oxidation results in the formation firstly of very unstable primary products (hydroperoxides, free radicals, conjugated dienes) which rapidly decompose into secondary products (aldehydes, ketones, alcohols, acids, etc.) [21, 22, 23].

Figure 44:
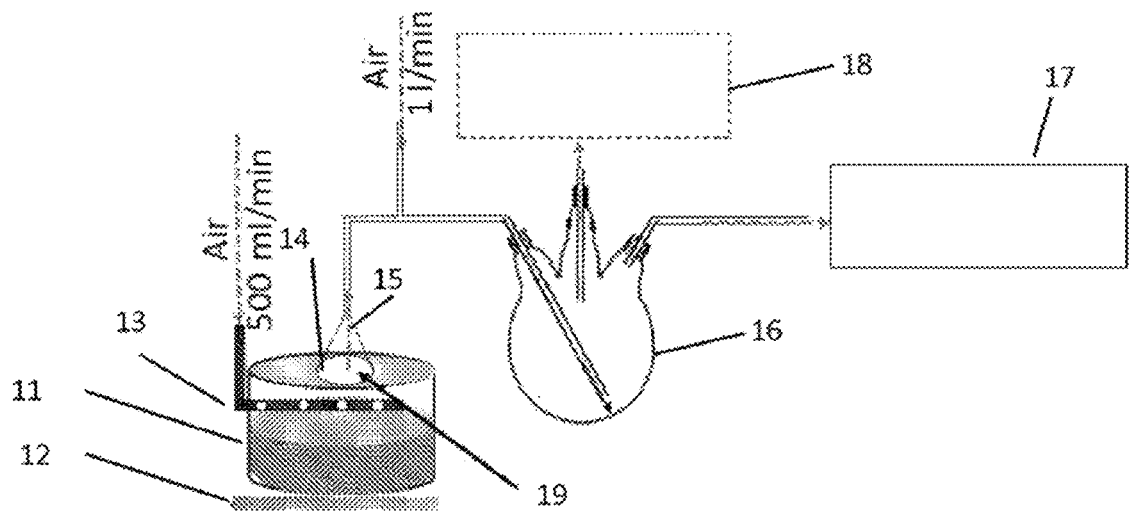
FIG. 44: Schematic representation of the experimental device for detecting total VOCs generated by cooking with oil.

The device used for cooking oil and recovering the total volatile organic compounds (VOCs) is shown schematically in FIG. 44. It is a pressure cooker 11 operating on an induction plate 12 with a sealed lid comprising an air inlet 13 and a central opening 14, 11 cm in diameter, on which rests a funnel 15 which is 15 cm in diameter. The air inlet makes it possible to sweep the headspace at 500 ml/min so as to recover the VOCs in order to measure them. The VOCs are collected by means of the funnel and the gas mixture is diluted with dry air (1 ml/min) before being entrained to a 500 ml three-necked round-bottomed flask 16. The gas mixture is pooled at 1.5 l/min using a peristaltic pump 17 in order to homogenize the atmosphere in the round-bottomed flask. The measurement of the VOCs is carried out with a photoionization detector (PID) 18, the head of which is maintained in the round-bottomed flask. In this study, 2 liters of sunflower oil for frying were continuously heated at 180° C. for 4 hours. The filter compartment 19 is filled with 30 g of material (example 18p or Norit RBAA-3 active carbon) or with a commercial filter (active carbon-impregnated foam, ref: SEB-SS-984689). The total VOC content downstream of the filter is monitored over time using the ppbRAE PID detector.

Figure 45:
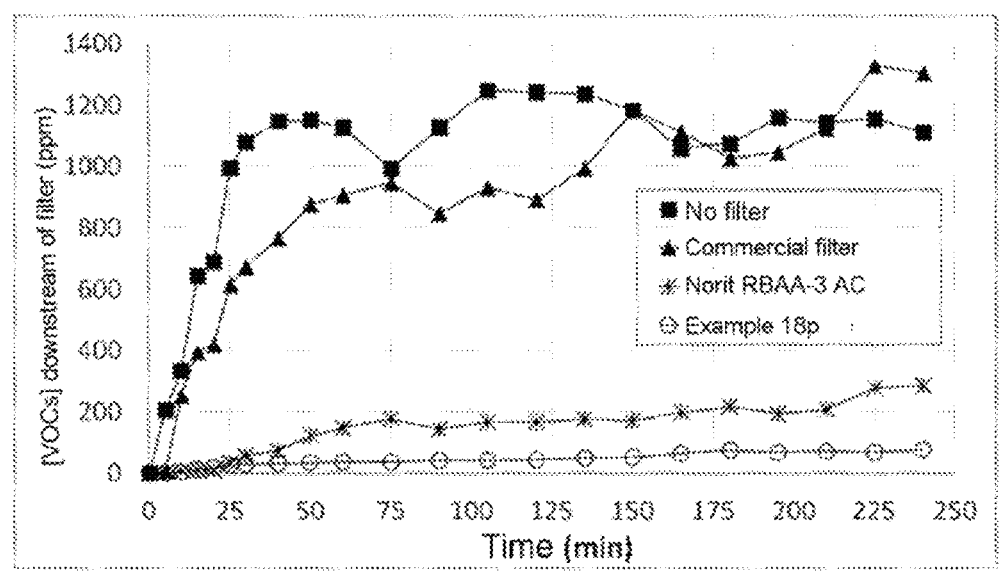
FIG. 45. Comparison of the efficiency of trapping of total VOCs, during cooking with oil, by various filters.

FIG. 45 shows the compared performance qualities of the various filters during the cooking of oil. The commercial filter only very slightly retains total VOCs. The adsorption of the total VOCs by the Norit RBAA-3 active carbon is also less efficient than the hybrid composite material even though these two materials exhibit a similar adsorption in the case of the study of the adsorption of a single pollutant.

Application Example 17: Tests for Trapping Total VOCs Resulting from the Oxidation of Oil by the Functionalized Hybrid Materials (Examples 18p and 24p) Differing from One Another by the Nature of the Active Carbon or by the Functionalization of the Matrix (Examples 18p and 22p)

Figure 46:
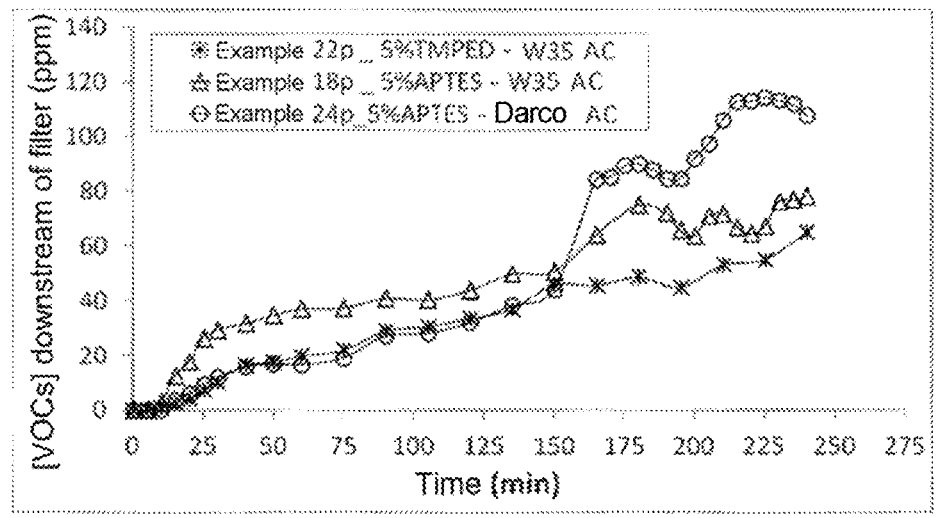
FIG. 46: Comparison of the efficiency of trapping of total VOCs, during cooking with oil, by various filters differing from one another by the nature of the active carbon (examples 18p and 24p) or by the silicate functionalization (examples 18p and 22p).

FIG. 46 shows the compared performance qualities of the various filters during the cooking of oil. In this study, 2 liters of sunflower oil for frying were continuously heated at 180° C. for 4 hours. The filter compartment is filled with 30 g of material (examples 18p, 22p and 24p). The device shown in FIG. 44 is used for collecting the total VOCs downstream of the various filters.

Contrary to FIG. 42, where the efficiency of the material of example 18p is better than that of example 22p for a single pollutant, hexaldehyde, a better efficiency of the material of example 22p is observed for the total VOCs originating from the cooking of oil. It should be noted that these efficiencies correspond to 95% and 94% trapping of total VOCs (~1300 ppm upstream) and remain high after 4 h of cooking. The replacement of the Norit W35 active carbon with the Darco KB-G causes a slight decrease in the trapping efficiency in the long term, which remains equal to 91%.

Application Example 18: Trapping of Diuron (Example of Reduction of Pollutants in Water)

Diuron is a phytosanitary product (pesticide, CAS No.: 330-54-1) which has a herbicidal effect. Diuron is widely used as a weed-killer for killing unwanted grasses and other annual and persistent large-leaf weeds, in particular in the cultivation of grapevines. It is found in surface water which must be treated for the production of potable water.

The adsorption capacity of the materials was determined on the basis of their suspension in solutions of pollutants and the study of the supernatant over time. For this, 10 mg of the materials to be tested are deposited in a plastic flask. 60 ml of an aqueous solution (Evian water) containing diuron at 20 mg/l are added and the solution is stirred at ambient temperature. Aliquots of 6 ml are taken over time and centrifuged to remove the traces of materials, and the supernatant solutions are studied by UV spectroscopy.

The materials tested are listed in table 12.

TABLE 12

Materials used for the comparative study of the diruon adsorption capacity

| | |
|---|---|
| W35 | Active carbon |
| $SiO_2$ | Silica nanoparticles |
| Example 1 | Nonfunctionalized hybrid |

Figure 47:
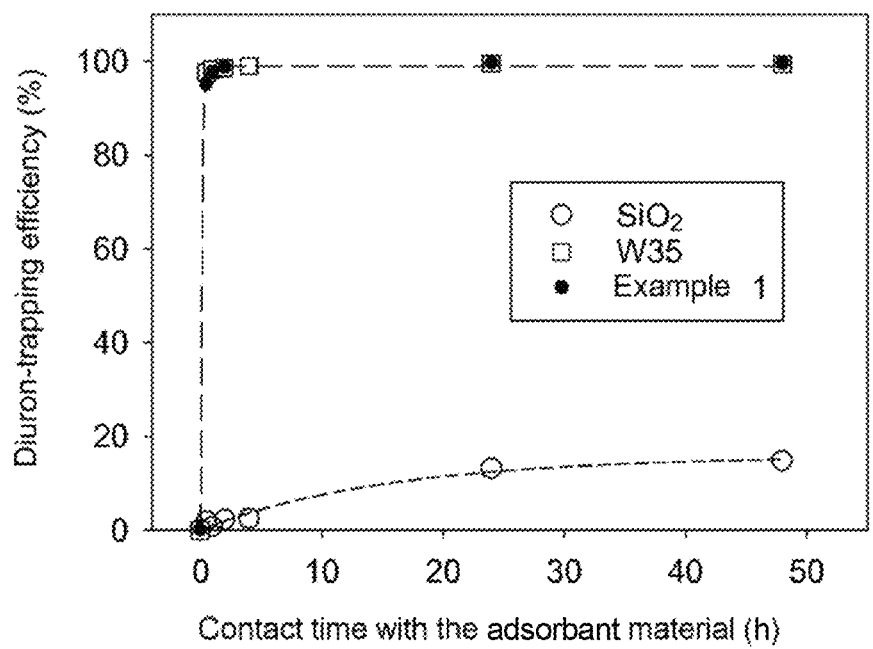
FIG. 47: Comparison of the efficiencies of trapping of diuron by various adsorbent materials.

Diuron in aqueous solution (Evian water) exhibits two absorption bands in the UV range with maxima at 249 nm and 212 nm. The absorbance at 212 nm of the diuron present in the solution is monitored over time. Table 13 and FIG. 47 show the comparison of the efficiencies of diuron trapping by the various materials.

TABLE 13

Comparison of the efficiencies of diuron trapping by various materials

|  | Contact time (h) | $SiO_2$ | W35 | Example 1 |
|---|---|---|---|---|
| % diuron adsorption | 0 | 0 | 0 | 0 |
|  | 0.5 | 2.0 | 97.6 | 95.1 |
|  | 1.0 | 0.8 | 98.3 | 97.8 |
|  | 2.0 | 2.2 | 98.7 | 98.8 |
|  | 4.0 | 2.4 | 99.1 |  |
|  | 24 | 13.1 | 99.6 | 99.6 |
|  | 48 | 14.8 | 99.4 | 99.5 |

Application Example 19: Trapping of 2,4,6-trichlorophenol 2,4,6-Trichlorophenol (CAS No.: 95-95-4) is a by-product of the chlorination of bisphenol A. This product is categorized in the CMR category. It is found in potable water treated with chlorine.

The adsorption capacity of the materials was determined on the basis of their suspension in solutions of pollutants and the study of the supernatant over time. For this, 10 mg of materials to be tested are deposited in a plastic flask. 60 ml of an aqueous solution (Evian water) containing 2,4,6-trichlorophenol at 20 mg/l are added and the solution is stirred at ambient temperature. Aliquots of 6 ml are taken over time and centrifuged to remove the traces of materials, and the supernatant solutions are studied by UV spectroscopy.

The materials tested are listed in table 14.

TABLE 14

Materials used for the comparative study of the 2,4,6-trichlorophenol adsorption capacity

| W35 | Active carbon |
|---|---|
| $SiO_2$ | Silica nanoparticles |
| Example 1 | Nonfunctionalized hybrid |

Figure 48:
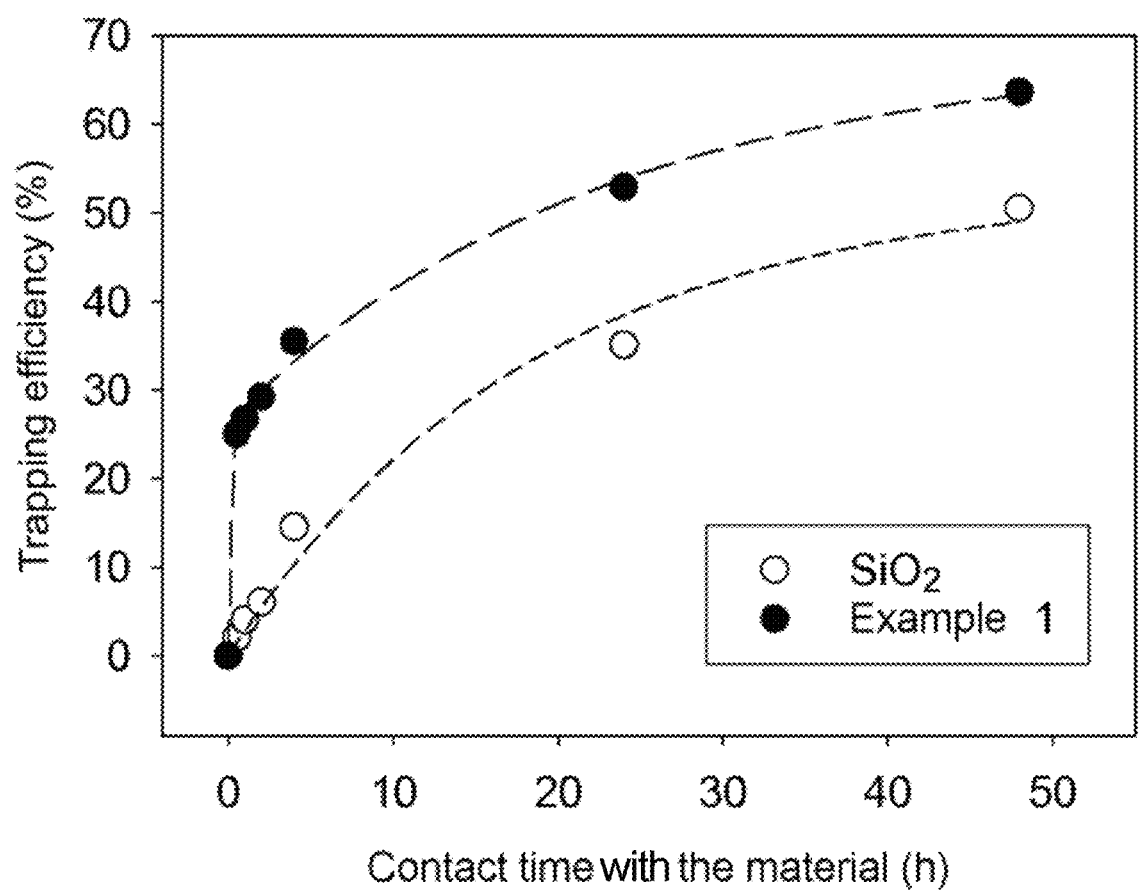
FIG. 48: Comparison of the efficiencies of trapping of 2,4,6-trichlorophenol by various adsorbent materials.

2,4,6-Trichlorophenol in aqueous solution (Evian water) exhibits an absorption band in the UV range with a maximum centered on 292 nm. The absorbance at 292 nm of the 2,4,6-trichlorophenol present in the solution is monitored over time. Table 15 and FIG. 48 show the comparison of the efficiencies of 2,4,6-trichlorophenol trapping by the various materials.

TABLE 15

Comparison of the efficiencies of 2,4,6-trichlorophenol trapping by various materials

|  | Contact time (h) | $SiO_2$ | Example 1 | W35 |
|---|---|---|---|---|
| % 2,4,6-trichlorophenol adsorption | 0 | 0 | 0 |  |
|  | 0.5 | 2.0 | 25.0 |  |
|  | 1.0 | 4.0 | 26.7 |  |
|  | 2.0 | 6.0 | 29.2 |  |
|  | 4.0 | 14.5 | 35.5 |  |
|  | 24 | 35.1 | 52.9 |  |
|  | 48 | 50.5 | 63.6 | 9.5 |

LITERATURE REFERENCES

[1] WHO/UNICEF (2014) Progress on drinking-water and sanitation—2014 update. Geneva, W. H. O.
[2] Dörfliger, N.; Perrin, J. Geosciences 2011, 13, 94.
[3] Order of Jan. 11, 2007 relating to the quality limits and references for raw water and water intended for human consumption mentioned in articles R. 1321-2, R.
[4] Lenntech technical sheet with list of the compounds trapped by active carbon in decreasing order of efficiency. http://www.lenntech.fr/bibliotheque/adsorption/adsorption.htm
[5] Filter medium for removal of sodium from drinking water and preparation method thereof, L., Yuntang; Pu, Jian; Sun, Shujun, Faming Zhuanli Shenqing (2011), CN 102059022 A
[6] Static and dynamic combined water purifier with multi-stage filter bed cyclone magnetization, W. Y., Faming Zhuanli Shenqing, (2014), CN 104058542 A
[7] Preparation of filter medium useful for removing synthetic musk from drinking water, a. i. u. i. w. d., Zhou, Qidi; Luan, Yuntang, Faming Zhuanli Shenqing (2012), CN 102350323 A
[8] Molded activated charcoal and water purifier involving same, Y., Hiroe; Arita, Satoru; Kawasaki, Shuji, PCT Int. Appl. (2011), WO 2011016548 A1
[9] Youji Li, Jun Chen, Jianben Liu, Mingyuan Ma, Wei Chen, Leiyong Li, Activated carbon supported $TiO_2$-photocatalysis doped with Fe ions for continuous treatment of dye wastewater in a dynamic reactor, Journal of Environmental Sciences 2010, 22(8) 1290-1296.
[10] K. Y. Foo, B. H. Hameed, Decontamination of textile wastewater via $TiO_2$/activated carbon composite materials, Advances in Colloid and Interface Science 159 (2010) 130-143.
[11] Meltem Asiltürk, Sadiye Sener, $TiO_2$-activated carbon photocatalysts: Preparation, characterization and photocatalytic activities, Chemical Engineering Journal 180 (2012) 354-363.
[12] Hongmei Hou, Hisashi Miyafuji, Haruo Kawamoto, Supercritically treated $TiO_2$-activated carbon composites for cleaning ammonia, Journal of Wood Science 53 (2006) 533-538.
[13] Biao Huang, Shiro Saka, Photocatalytic activity of $TiO_2$ crystallite-activated carbon composites prepared in supercritical isopropanol for the decomposition of formaldehyde, Journal of Wood Science 49 (2003) 79-85.
[14] Juan Zhang, Dishun Zhao, Jinlong Wang, Liyan Yang, Photocatalytic oxidation of dibenzothiophene using $TiO_2$/bamboo charcoal, Journal of Materials Science 44 (2009) 3112-3117.
[15] Karran Woan, Georgios Pyrgiotakis, Wolfgang Sigmund, Photocatalytic carbon-nanotube-$TiO_2$ composites, Advanced Materials 21 (2009) 2233-2239.
[16] Curdts, B.; Pflitsch, C.; Pasel, C.; Helmich, M.; Bathen, D.; Atakan, B. Novel silica-based adsorbents with activated carbon structure, Microporous and Mesoporous Materials 2015, 210, 202
[17] Guo, X.; Liu, H.; Shen, Y.; Niu, M.; Yang, Y.; Liu, X.; Theoretical and experimental studies on silica-coated carbon spheres composites, Applied Surface Science 2013, 283, 215.
[18] R. S. Rao, K. El-Hami, T. Kodaki, K. Matsushigi, K. Makino, Another method of synthesis of silica nanoparticles, Journal of Colloid and Interface Science, 289(1), 125-131, (2005).

[19] I. Ab Rahman, V Padavettan, Synthesis of silica nanoparticles by solgel: size-dependent properties, surface notifications and applications in silica-polymer nanocomposites—A review, Journal of Nanomaterials, Vol 2012, Article ID 132424, doi: 10/1155/2012/132424.

[20] M. A. Martín-González, O. González-Diaz, P. Susial, J. Araña, J. A. Herrera-Melián, J. M. Doña-Rodríguez, J. Pérez-Peña, Reuse of *Phoenix canariensis* palm frond mulch as biosorbent and as precursor of activated carbons for the adsorption of Imazalil in aqueous phase, Chemical Engineering Journal 245 (2014) 348-358.

[21] H. W. S. Chan, D. T. Coxon, K. E. Peers, K. R. Price, Oxidative reactions of unsaturated lipids, Food Chemistry, 9 (1-2), p. 21-34, 1982.

[22] E. N. Frankel, *Volatile lipid oxidation products*, Progress Lipid Research, 22, p. 1-33, 1982.

[23] C. Berset, M. E. Cuvelier, Méthodes d'évaluation du degré d'oxydation des lipides et de mesure du pouvoir antioxydant, Sciences des aliments [Methods for evaluating the degree of oxidation of lipids and for measuring the antioxidant capacity, Food Sciences], publisher Lavoisier, p. 219-245, 1996.

The invention claimed is:

1. A method for preparing a core-shell hybrid material consisting of an active carbon core surrounded by a shell of a mesoporous sol-gel silica material, said method comprising the formation of a mesoporous sol-gel silica shell around active carbon particles.

2. The method as claimed in claim 1, wherein the mesoporous sol-gel silica shell is formed from at least one organosilicon precursor chosen from tetramethoxysilane (TMOS), tetraethoxysilane (TEOS), phenyltrimethoxysilane (PhTMOS), phenyltriethoxysilane (PhTEOS), (2-phenylethyl)triethoxysilane, 3 aminopropyltriethoxysilane (APTES), (3-glycidyloxypropyl)trimethoxysilane (GPTMOS), (3-glycidyloxypropyl)triethoxysilane (GPTES), N-(2-aminoethyl)-3-(trimethoxysilyl)propylamine (NH2-TMOS), N (trimethoxysilylpropyl)ethylenediamine triacetate, acetoxyethyltrimethoxysilane (AETMS), ureidopropyltriethoxysilane (UPTS), 3-(4-semicarbazidyl)propyltriethoxysilane (SCPTS) and mixtures thereof.

3. The method as claimed in claim 1, wherein the organosilicon precursor is tetramethoxysilane or tetraethoxysilane.

4. The method as claimed in claim 1, wherein the organosilicon precursor is a mixture of tetramethoxysilane and of a functionalized organosilicon precursor, advantageously chosen from phenyltrimethoxysilane (PhTMOS), phenyltriethoxysilane (PhTEOS), (2-phenylethyl)triethoxysilane, 3-aminopropyltriethoxysilane (APTES), (3 glycidyloxypropyl)trimethoxysilane (GPTMOS), (3-glycidyloxypropyl)triethoxysilane (GPTES), N-(2-aminoethyl)-3-(trimethoxysilyl)propylamine (NH2-TMOS), N (trimethoxysilylpropyl)ethylenediamine triacetate, acetoxyethyltrimethoxysilane (AETMS), ureidopropyltriethoxysilane (UPTS), 3-(4-semicarbazidyl)propyltriethoxysilane (SCPTS) and mixtures thereof.

5. The method as claimed in claim 1, wherein the formation of the mesoporous sol-gel silica shell around active carbon particles comprises:
 a) the formation of a sol-gel nanoparticle shell around active carbon in a basic aqueous solution starting from at least one organosilicon precursor, the aqueous solution containing aqueous ammonia (NH4OH) and a surfactant,
 b) the recovery of the active carbon surrounded by the sol-gel material shell prepared in step a),
 c) the elimination of any surfactant residues from the active carbon surrounded by the sol-gel material shell so as to free the pores of the sol-gel material formed in step a),
and wherein, in step a), a basic aqueous solution containing aqueous ammonia, the surfactant and the active carbon is first provided, then the at least one organosilicon precursor is added, this precursor being solubilized in an organic solvent.

6. The method as claimed in claim 1, wherein the organic solvent is chosen from C1 to C4 linear aliphatic alcohols.

7. The method as claimed in claim 1, wherein the organic solvent is ethanol.

8. The method as claimed in claim 1, wherein the active carbon is in powder form.

9. The method as claimed in claim 1, wherein the surfactant is an ionic surfactant.

10. The method as claimed in claim 1, wherein the surfactant is cetyltrimethylammonium bromide.

11. The method as claimed in claim 1, wherein the step of formation of the sol-gel silica nanoparticle shell comprises the preparation of a sol of a mixture of at least one organosilicon precursor in an aqueous solution containing an organic solvent, followed by the coating of the active carbon with this sol.

12. The method as claimed in claim 1, wherein the active carbon is in the form of rods of millimetric size and the coating of said active carbon is carried out by dipping the rods in the sol then removing them from the sol or by pouring the sol over the rods through a sieve.

13. The method as claimed in claim 1, wherein the active carbon is in powder form and the coating is carried out by adding the active carbon powder to the sol, then the mixture obtained is poured into molds.

* * * * *